April 3, 1956   C. J. BOCK ET AL   2,740,303
HEAVY DUTY DRIVE GEARING AND CONTROL SYSTEM
Filed Feb. 14, 1951   10 Sheets-Sheet 3

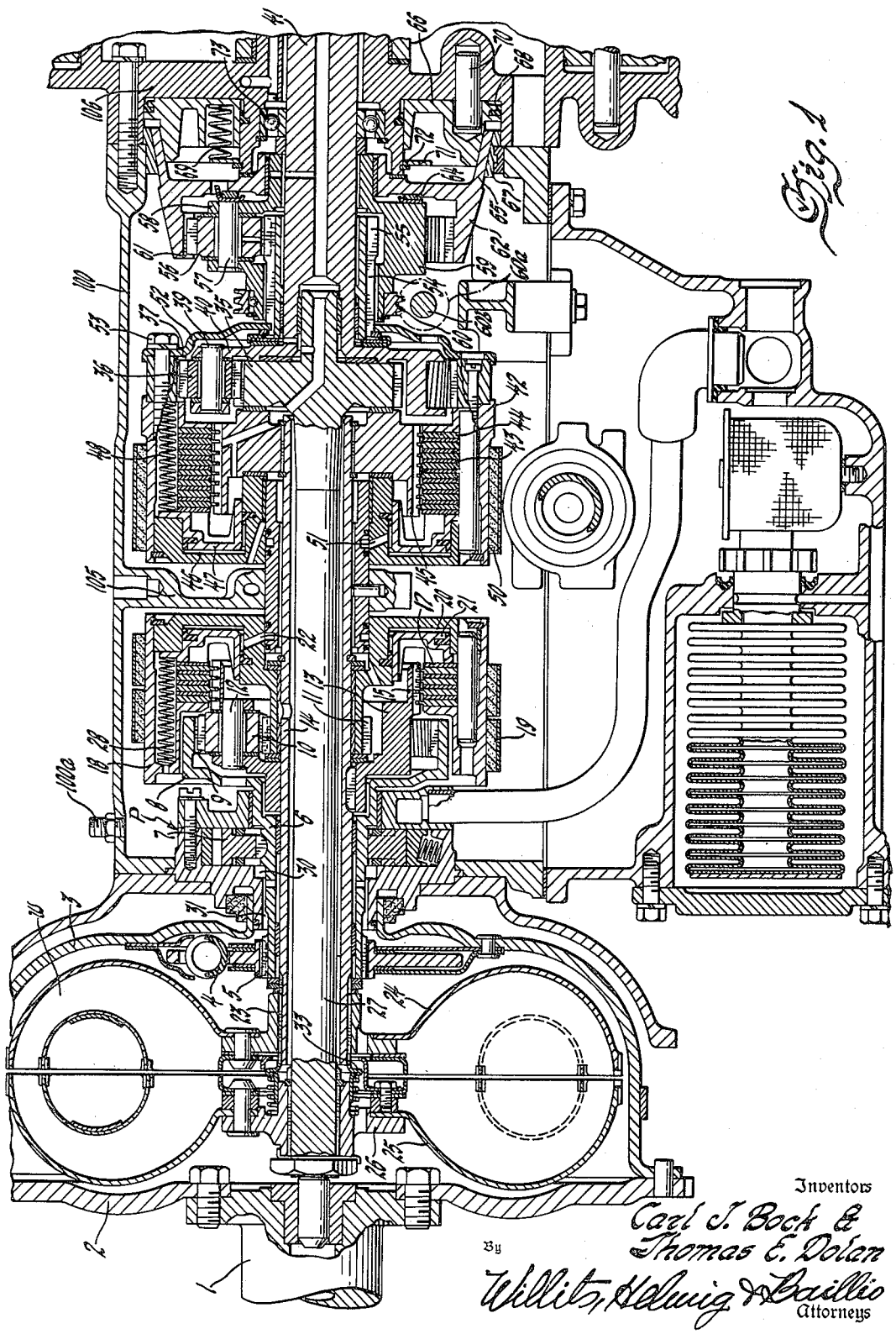

Inventors
Carl J. Bock &
Thomas E. Dolan
By Willits, Helwig & Baillio
Attorneys

April 3, 1956  C. J. BOCK ET AL  2,740,303
HEAVY DUTY DRIVE GEARING AND CONTROL SYSTEM
Filed Feb. 14, 1951  10 Sheets-Sheet 4

Inventors
Carl J. Bock &
Thomas E. Dolan
By Willits, Helmig & Baillio
Attorneys

April 3, 1956 C. J. BOCK ET AL 2,740,303
HEAVY DUTY DRIVE GEARING AND CONTROL SYSTEM
Filed Feb. 14, 1951 10 Sheets-Sheet 7

Inventors
Carl J. Bock &
Thomas E. Dolan
By Willits, Helmig & Baillie
Attorneys

April 3, 1956  C. J. BOCK ET AL  2,740,303
HEAVY DUTY DRIVE GEARING AND CONTROL SYSTEM
Filed Feb. 14, 1951  10 Sheets—Sheet 10
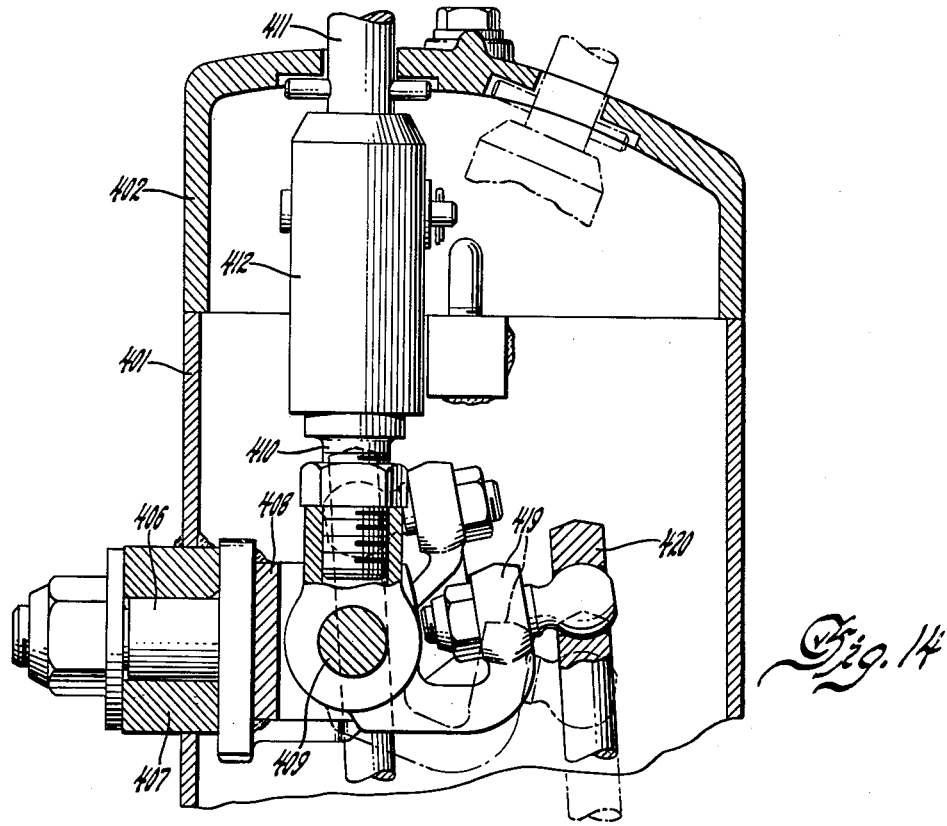
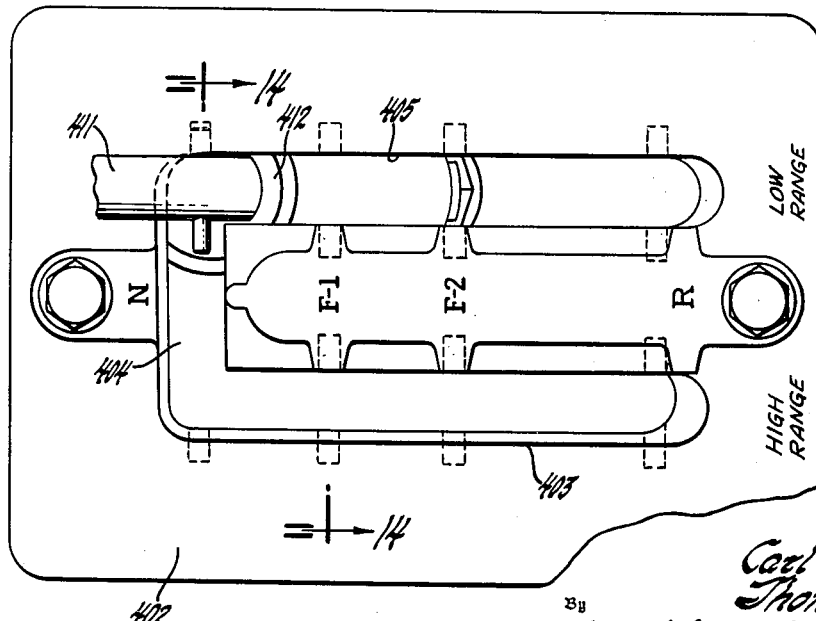
Inventors
Carl J. Bock &
Thomas E. Dolan
By Willits, Helmig & Baillio
Attorneys

United States Patent Office 2,740,303
Patented Apr. 3, 1956

2,740,303

HEAVY DUTY DRIVE GEARING AND CONTROL SYSTEM

Carl J. Bock, Birmingham, and Thomas E. Dolan, Detroit, Mich., assignors to General Motors Corporation, Detroit, Mich., a corporation of Delaware Application February 14, 1951, Serial No. 210,830

28 Claims. (Cl. 74—472)

This invention relates to transmissions and more particularly to transmissions of the step-ratio type and controls therefor. It is directed to improvements in transmissions having a plurality of gearing units, each of which is controlled by means of a control system operatively associated therewith. The invention represents a number of improvements in such gearing arrangements and the control system therefor whereby a plurality of gear ratio ranges may be selected to meet the requirements of different operating conditions encountered in the operation of a motor vehicle, and is particularly useful for heavy duty transmissions as may be used in trucks, busses, and military vehicles.

The invention provides for completely automatic shifting in one of the transmission units to provide four forward and one reverse drive gear ratios in said unit and for direct drive and reduction drive through the gearing of the other of the transmission units. The two units are operatively connected in series to provide for eight forward gear ratios and two reverse gear ratios to the final load shaft of the transmission.

The invention further provides a manually controlled valve movable to provide two forward drive ranges in one of the transmission units whereby the timing of the automatic shift of the unit may be varied.

The invention further provides a common operating member for controlling the position of manually operated valves associated with each of the gearing units arranged to provide for shift of gear ratio of one unit only when the manually operated valve of the other unit is positioned for neutral or no-drive condition of operation of the transmission unit controlled thereby.

An object of this invention is to provide a vehicle transmission having a first gearing unit and a second gearing unit connected in series and having a control system providing for four forward gear ratios in the first gearing unit and two gear ratios in the second unit.

Another object of this invention is to provide a vehicle transmission having a first gearing unit and a control system therefor including automatically movable shift valves for selecting four gear ratios therein and a manually operated valve movable to two forward drive range positions effective to provide for a different timing of the automatic shift valves in each of its forward drive range positions, and including a second gearing unit connected in series with the first gearing unit in which a manually operated valve is movable to provide direct drive or reduction drive in the second gearing unit.

A further object of this invention is to provide a transmission having a first gearing unit and a second gearing unit connected in series and having a manually operated valve associated with the control system of each of said gearing units for selecting the operating condition of the gearing unit controlled thereby, together with a common operating member for positioning the manually operated control valves and having means effective to shift one of said manually operated valves only when the other of said manually operated valves is positioned to select neutral or no-drive condition of operation of the other of said gearing units.

These and other objects of this invention will be apparent from the following description and claims, taken in conjunction with the accompanying drawings, in which:

Figures 1 and 1a are companion figures, in section, illustrating the transmission gearing.

Figure 14 is a partially sectional view taken along the lines 14—14 of Figures 13 and 15.

Figure 15 is a plan view taken along the lines 15—15 of Figure 13.

Figure 10:
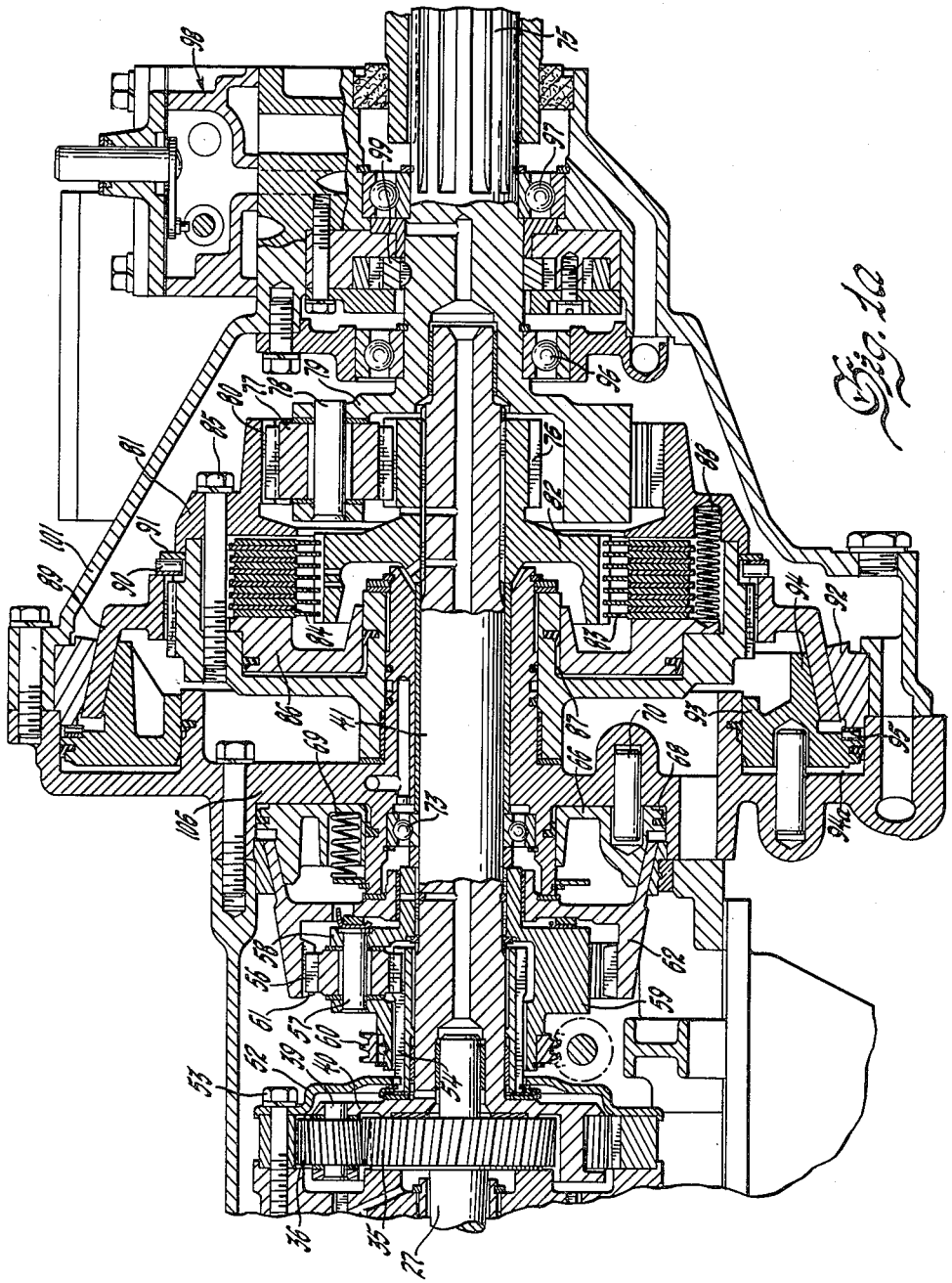
Figure 10 is a view similar to Figure 8, illustrating the manually operated valve as positioned for reverse operation of the primary transmission unit.

The drive structure of the transmission is shown in section in companion Figures 1 and 1a. Engine shaft 1 is bolted to flywheel plate 2 fastened to drum 3 connected by vibration damper 4 to hub 5, splined to hollow shaft 6, which is keyed to drive the rotor 7 of a variable capacity pump P, shaft 6 being formed at the right into drum 8 having internal teeth 9 meshing with planet gears 10, which planet gears in turn mesh with sun gear 11. The planets 10 are supported upon spindles 12 of carrier 13 connected to shaft 14, the right-hand portion of the carrier being formed to accommodate clutch plates 15 mating with plates 17 rotating with drum 18 connected to sun gear 11. This gear group is made operative by application of band 19 to drum 18 of sun gear 11, or by engaging the clutch plates 15, 17. The right-hand inner wall of drum 18 is recessed to form an annular cylinder space 20 for clutch piston 21, fed by pressure in passage 22. Pump P may be of the type shown in the United States application for Letters Patent of Walter B. Herndon and Richard L. Thorman, Serial No. 153,342, filed April 1, 1950.

The forward extension of hollow shaft 14 is splined to the hub 23 of fluid flywheel rotor 24, facing rotor 25 to form a fluid turbine working space W. Hub 26 of rotor 25 is splined to the forward end of transmission shaft 27.

Clutch 15, 17 is spring loaded for disengagement by spring 28 supported in the left wall of drum 18. Fluid pressure from pump P is utilized to supply operating pressure for actuating the various bands and clutches as hereafter more fully explained, and also to maintain working fluid in the fluid coupling. Pressure from port 30 is admitted to the interior of the fluid coupling housing by means of passage 31. When the pressure in the working chamber W exceeds a predetermined amount, a valve 33 opens to permit the excess pressure to be discharged from chamber W to the space between hollow shaft 14 and solid shaft 27, the pressure fluid so discharged being used for lubrication purposes and finally being returned to the transmission sump after having performed its lubrication function. Due to the configuration of valve 33, pressure acting upon the end of valve 33 is able to move the valve against the valve spring to permit fluid to discharge into the space between shaft 27 and sleeve 14.

The casing web 105 divides the transmission radially, and supports the shafting as shown, while providing passage space for the fluid servo and pressure feed connections (not shown). A nipple 100a is adapted to be connected to a source of air under pressure for pressurizing the transmission when the transmission is operated under water, as in fording a stream with the vehicle.

In Figure 1, the gear group 35, 36, 37, is dealt with as the second gear group of the primary gearing unit, and shaft 27 is integral with sun gear 35 meshed with planet gears 36 supported upon spindles 39 of carrier 40 integral with shaft 41. Internal gear 37 meshed with planets 36 is attached to drum 42 which is equipped with key bolts for clutch plates 43, mating with plates 44 keyed to drum 45 splined on the rear portion of shaft 14. The forward wall of drum 42 is recessed to form an annular cylinder space 46 for piston 47, and springs 48 serve to disengage clutch plates 43 and 44 when chamber 46 is connected to exhaust.

The second unit ratio is actuated by alternate application of band 50 to drum 42 of annular gear 37, or engagement of clutch 43—44. The clutch engaging and holding pressure is delivered by passage 51 to chamber 46.

Figure 5:
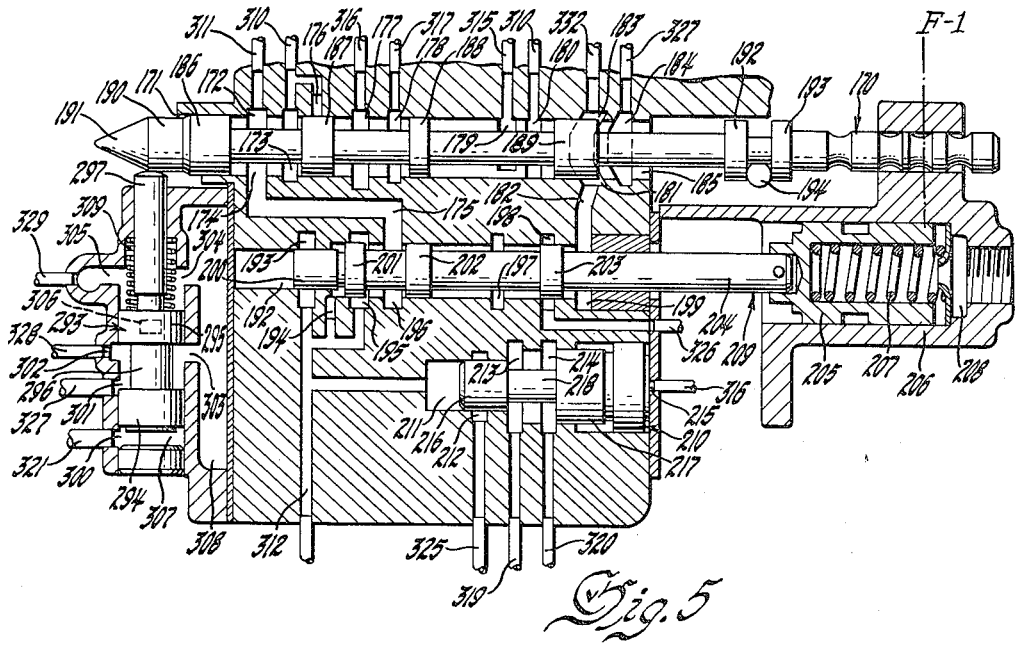
Figure 5 is a partially sectional view of one group of control valves for the primary transmission unit illustrating the valve and porting arrangement in detail.

The gear unit to the right of the second primary unit gear group is for providing reverse rotation of shaft 41. The plate 52, secured to drum 42 by key bolt 53, is splined to the forward portion of sleeve 54 of sun gear 55, which sun gear meshes with planet gears 56 supported upon spindles 57 of carrier 58 splined to shaft 41. Reverse carrier unit 58, splined to shaft 41, has affixed planet spindles 57, and the forward half 59 of carrier 58 is fixed to speedometer and governor drive gear 60. The planet gears 56 of spindles 57 mesh with sun gear 55, the sleeve extension 54 of which is splined to plate 52, and also mesh with annulus gear 61 on a drum 62 supported for axial movement on carrier 58 by a bearing sleeve, and for abutment against thrust washer 64. Drum 62 is formed into a brake cone 65 at the right, operable to be braked by piston 66 against backing cone 67 keyed to the housing 100. The brake cone is applied when the manually operated valve 170 of Figure 5 is moved to reverse drive position. Fluid pressure is then directed to chamber 68 behind piston 66 to force the piston to compress release springs 69 and to prevent rotation of annulus gear 61. The annular piston is guided on pins 70 and thus held against rotation forces. Brake release springs 69 are retained by annulus disc 71 on an extension of housing web 106 and held against leftward motion by locking ring 72. A bearing 73 is disposed between shaft 41 and the housing web 106.

The gear unit at the extreme right of Figure 1a is a so-called auxiliary or reduction unit connected in series with the heretofore described gear units, the auxiliary unit being a two-speed planetary unit adapted to be operative to provide, in combination with the afore-mentioned gear units, for two reverse gear ratios and eight forward gear ratios for the entire transmission.

Shaft 41 is journaled in final output or load shaft 75, there being a sun gear 76 splined to shaft 41. Planet gear 77 supported upon spindles 78 of carrier 79 formed on the inner end of output shaft 75, mesh with sun gear 76 and also mesh with internal gear 80 formed on drum 81. A sun gear drum extension 82 has splined thereto a plurality of clutch plates 83 adapted to engage clutch plates 84 of the drum 81 of annulus gear 80. Key bolts 85 affix the clutch plates 84 to the annulus gear drum 81. A piston 86 disposed in a recess or chamber 87 formed within the drum 81 is adapted to engage clutch 83—84 for direct drive through the auxiliary unit, the sun gear 76 and annulus gear 80 rotating as a unit when the clutch is engaged. Fluid pressure is admitted to chamber 87 behind piston 86 for direct drive, without gear reduction in the auxiliary unit. Clutch release springs 88 release the clutch when pressure is exhausted from chamber 87.

A conical braking member 89 is splined for axial motion on the outer surface of drum 81. A wave-washer spring 90 held by retainer ring 91 yieldably urges conical braking member 89 to a released position. A conical backing member 92 is fixed to the casing 101. A piston 93 having a conical extension 94 is disposed in an annular recess provided in the casing for preventing rotation of braking member 89 when fluid pressure is supplied to chamber 94a behind the piston. A wave-washer spring 95, disposed between piston 93 and backing member 92 urges piston 93 to its released position when fluid pressure is exhausted from chamber 94a.

When pressure fluid is admitted to chamber 94a to apply piston 93, drum 81 and annulus gear 80 are held against rotation. With power input to the auxiliary unit from sun gear 76, carrier 79 and final load shaft 75 will be rotated at a reduced speed with respect to shaft 41. Thus, while shaft 41 may be caused to rotate in any one of four forward gear ratios or a single reverse gear ratio as a result of selective application of the bands and clutches of the first, rear, and reverse units, the load shaft 75 may be caused to rotate in any of eight forward gear ratios or two reverse gear ratios, by application of the auxiliary unit cone brake or clutch. With the auxiliary unit clutch 83—84 engaged, load shaft 75 rotates at the same speed as shaft 41, but with cone brake 89 engaged the shaft 75 rotates at lesser speed than that of shaft 41.

A pair of spaced bearings 96 and 97 support load shaft 75 in the transmission casing, there being a load shaft driven pump 98 bolted to the rear portion of the casing and having its driving gear 99 keyed to the final load shaft 75. The load shaft pump may be of the "gerotor" type, such pumps being well-known in the art.

Figure 2:
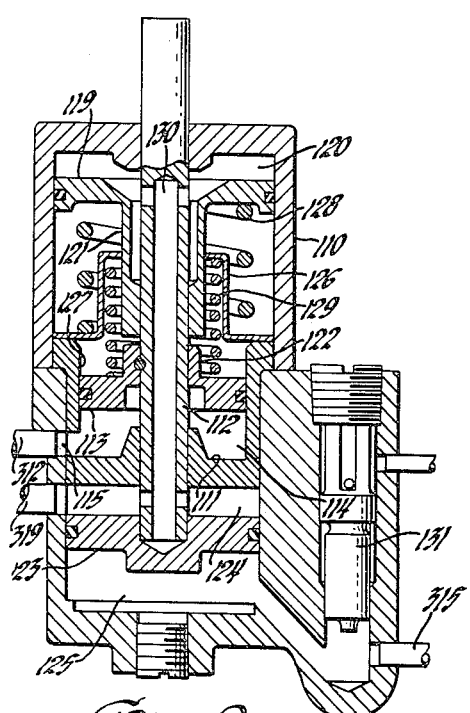
Figure 2 is a sectional view of the first planetary gearing unit band applying servo means.

In Figure 2, the band applying servo unit for the front band of the primary transmission unit is illustrated. The actuation of the unit is dependent upon the admission of pressure fluid thereto as controlled by the manually operated valve and automatic shift valves of the control system hereafter more fully explained. When the valve 170 (see Figure 8) is positioned in "neutral," no pressure fluid is directed to the front band servo. The servo unit includes a casing 110 forming a cylinder having a web 111 extending transversely across the cylinder and supporting a stem 112 therein. A piston 113 is fixed to stem 112, the piston 113 and web 111 forming a chamber 114 therebetween. A port 115 connects chamber 114 to a throttle valve (hereafter termed a T–V valve) pressure supply passage 312, the throttle valve delivered pressure acting to assist in the application of the band. Stem 112 extends through one end of the casing to engage a bracket (not shown) carried by the front band. A piston 119 is slidably positioned in the upper portion of the housing, forming a chamber 120 between the piston and end of the housing. A stem 121 on piston 119 may engage a boss 122 on piston 113 when pressure fluid is admitted to chamber 120 to force the piston 119 downwardly in the housing. A third piston 123 is slidably positioned in the housing beneath web portion 111, dividing the lower portion of the cylinder into chambers 124 and 125. A cup-shaped member 126 is positioned over stem 121, the base of the cup-shaped member being supported upon a shoulder 127 formed on the casing. A spring 128 yieldably urges piston 119 upwardly in chamber 120. A spring 129 positioned within the cup-shaped member 126 yieldably urges piston 113 downwardly toward web member 111, this spring being effective to release the front band when no pressure is supplied for applying the band. A passage 130 in stem 112 communicates with chamber 124 and with chamber 120.

To apply the band, pressure fluid from front band apply passage is admitted to chamber 125 beneath piston 123 to force stem 112 outwardly against the band (not shown). To release the band, pressure fluid is admitted from front band release passage 319 to chamber 124 and through hollow stem 112 to chamber 120. This band release pressure, plus the effect of the springs is effective to release the band even though band apply pressure may simultaneously be acting in chambers 125.

A so-called 4th to 3rd control valve 131 controls the passage leading to chamber 125. Governor pressure, as determined by vehicle speed, acts on the top of the 4th to 3rd control valve 131. At vehicle speeds below a predetermined velocity, for example 25 miles per hour, the line pressure in passage 315 keeps the valve in a position so that the entire passage leading to chamber 125 is open. At vehicle speeds above the predetermined speed, governor pressure acting upon the top of the 4th to 3rd control valve 131 is great enough to move the valve to restrict the flow of pressure fluid to chamber 125. This delays the front band application and permits the engine speed to increase before the band is applied to put the front unit in reduction during the fourth to third speed downshift. This same condition exists upon full throttle 2nd to 3rd upshifts.

Figure 3:
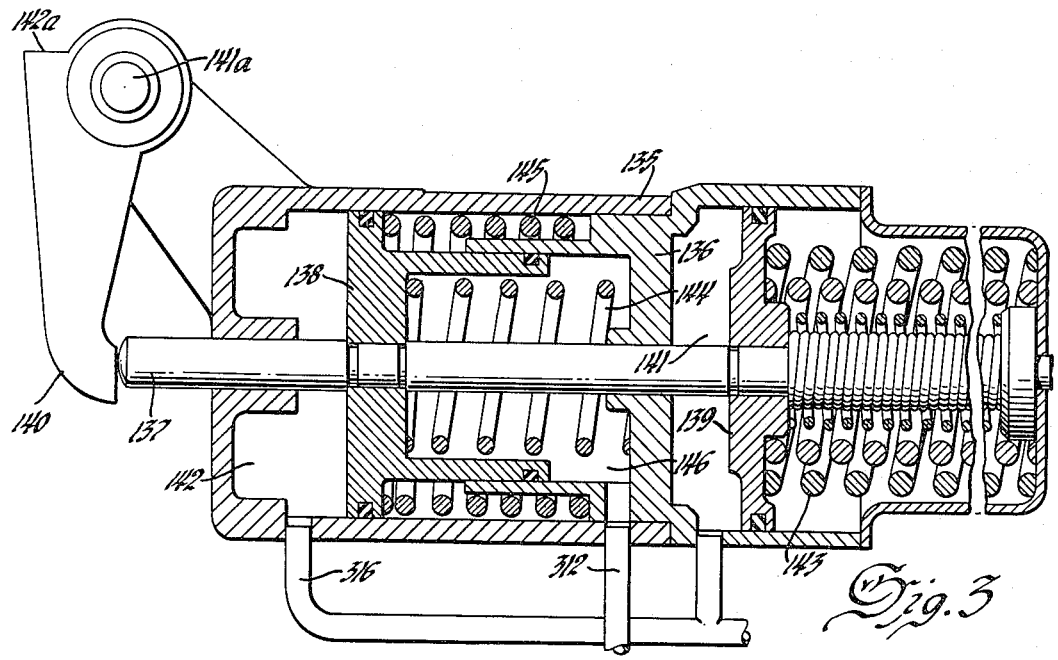
Figure 3 is a sectional view of the second planetary gearing unit band applying servo means.

The rear unit band servo unit is shown in Figure 3, and includes a housing 135 having a web portion 136 extending transversely to the cylindrical chamber formed by the housing. A stem 137 is guided by web 136, the stem having a pair of pistons 138 and 139 fixed thereto. The stem protrudes outwardly from the housing to contact one end of a lever 140, pivoted on a rod 141a. A rod (not shown) pinned to the rear band contacts a shoulder 142a of lever 140. Springs 143 positioned between one side of piston 139 and one end of the casing 135, together with springs 144 and 145 acting upon piston 138, yieldably urge stem 137 outwardly against lever 140, causing the lever to rotate and apply the rear unit band. Thus, in the absence of pressure fluid influence, the rear band is spring applied.

A rear band release passage 316 supplies pressure fluid to chambers 141 and 142, this pressure acting upon pistons 138 and 139 to compress the band applying springs and thus release the band. A passage 312 supplies throttle valve pressure to chamber 146, this pressure acting upon piston 138 to assist the springs in applying the band.

The front band applying pressure, front band releasing pressure, rear band releasing pressure, and throttle valve pressures are controlled by the control system valving hereafter explained.

The gear train combination of the front and rear units with the flywheel 24, 25 and the reverse gear group provides four forward speed ratios by actuation of the friction torque substaining elements, namely brakes and clutches, in the following pattern in which the notation "X" indicates actuation.

|  | Front Unit | | Rear Unit | |
| --- | --- | --- | --- | --- |
|  | Brake | Clutch | Brake | Clutch |
| First | X |  | X |  |
| Second |  | X | X |  |
| Third | X |  |  | X |
| Fourth |  | X |  | X |

In the primary unit first gear ratio, the front band 19 is applied by pressure fluid acting in chamber 125 beneath piston 123, while the rear unit brake 50 is applied by force of springs 143, 144, 156, augmented by T-V pressure acting in chamber 146 upon piston 138. The carrier 13 of the front unit is the power output member of the front unit, and transmits drive in the reduction ratio of the front unit through the fluid flywheel 24, 25 to the input power member, sun gear 35, of the rear unit when drum 18 is held by band 19. The fluid flywheel 24, 25 couples the two units at the variable slip ratio determined by the torque of shaft 27 and the speed of hollow shaft 14.

In second speed ratio, brake 19 is released while clutch 15, 17 is engaged to set up a 1–1 locking couple of the front unit, the hollow shaft 6 now driving impeller rotor 24 at engine speed. The drive train in low and second is a series drive, front unit to rear unit, as coupled by the fluid flywheel 24, 25.

For drive in third, the front unit clutch 15, 17 is released and front unit band 19 is re-applied, and the rear unit brake 50 is released while rear clutch 43, 44 is actuated. The drive train now divides the torque of hollow shaft 14, one component being sustained by the fluid flywheel 24, 25, and the other by clutch 43, 44. In the rear unit these torque components are combined, the first being determined by sun gear 35, and the second by annulus gear 37 to drive output connected carrier 40 forwardly.

Drive in fourth gear is obtained by release of brake 19, while actuating clutch 15, 17. The torque of the engine on hollow shaft 6 is divided, one fraction being delivered by fluid flywheel 24, 25 to sun gear 35 at a speed averaging between 3 and 5 per cent differential to that of the annulus gear 9 which rotates at engine speed.

For reverse, the front band 19 and reverse cone brake 65 are applied. The carrier 58 of the reverse unit being connected to load shaft 41, and the annulus gear 37 of the rear unit connected by radial web 52 to the reverse unit sun gear 55, the application of engine torque to central shaft 27 and to rear unit sun gear 35 first furnishes a backward rotation component to annulus gear 37, since the rear unit carrier 40 is stopped or at low rotational speed. With the reverse unit annulus gear 61 stopped by cone 65, the reverse component applied by reverse unit sun gear 55 causes planets 56 to roll around the annulus gear 61 in reverse direction, applying a reverse torque to reverse unit carrier 58. As soon as reverse rotation of shaft 41 occurs, the rear unit carrier 40 partakes of the reverse rotation and the full reverse ratio of the combination becomes effective. The fluid flywheel 24, 25 furnishes all of the reverse drive torque.

The reduction or auxiliary unit is connected in series with shaft 41, so that final output shaft 75 is caused to rotate either at the same speed as shaft 41 (direct drive) or at a reduced speed with respect to shaft 41 (reduction). For direct drive, clutch 83, 84 is engaged through action of pressure fluid in chamber 87, thereby locking the sun gear 76 to the annulus gear 80. Planet gears 77 and carrier 79 thereupon cause output shaft 75 to rotate at the same speed as shaft 41.

For reduction drive in the auxiliary unit, brake 89—92 is applied through action of pressure fluid in chamber 94a, the brake anchoring annulus gear 80 to the housing. Planet gears 77 and carrier 79 thereupon rotate at reduced speed of rotation relative to that of shaft 41, the reduction being determined by the gearing ratio of the auxiliary unit. The auxiliary unit is always connected to shaft 41, either in direct drive or reduction, there being no neutral position in the reduction unit. A manually operated valve 340, actuated by a vehicle operator control handle, maintains the rear unit in one of these two operative positions. The linkage mechanism for positioning the auxiliary unit manually operated valve is shown in Figures 12, 13, 14 and 15 as hereafter explained in detail. Changes of ratio in the auxiliary unit can occur only when the manually operated valve for the four speed gear ratio section of the transmission is placed in neutral.

Governor pressure

Figure 4:
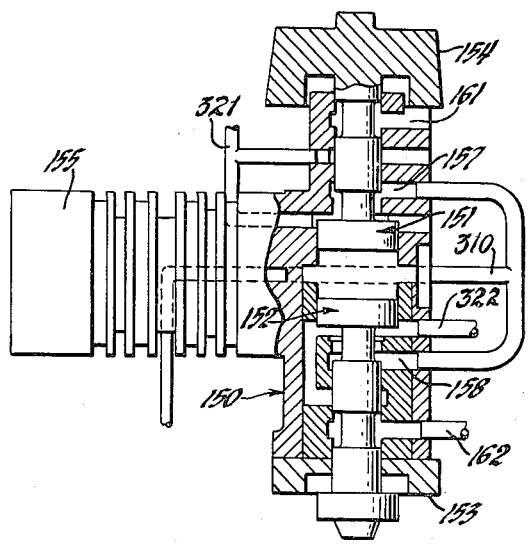
Figure 4 is a partially sectional view of the governor.

A governor 150 shown in Figure 4 is driven from gear 60 of carrier drum 59 at the speed of shaft 41. Governor pressure, which increases with vehicle speed, is applied to the automatic shift valves of the control system tending to upshift the automatic shift valves. The governor furnishes two output pressures, G-1 and G-2, the G-1 pressure being fed to governor plugs 242 and 277 (see Figure 6) associated with the 1st to 2nd and 3rd to 4th shift valves 220 and 276, respectively, to the shift valve piston 266 of the 2nd to 3rd shift valve 266, to the 4th to 3rd downshift valve 131, and to the reverse delay valve 306. G-2 pressure is fed to the regulator plug 252 of the 2nd to 3rd shift valve, to the bottom of the 2nd to 3rd shift valve itself and to the large piston of the 3rd to 4th shift valve. These functions will be hereafter more fully explained.

The governor itself includes a pair of valves 151 and 152 which are alike, except for the masses of the calibrating weights 153 and 154. Gear 60a is driven by gear 60 (see Figure 1) fixed to a shaft 60b to which is pinned the rotating governor body 150 carrying valves 151 and 152. The body has a pump pressure feed passage 310 open to input ports 157 and 158, and two delivery passages 321 and 322, one from each of the valves, and the outer radial ports 161 and 162 vent the excess pressure fluid to sump. With increase of speed of rotation of shafts 41 and 60b, the valves 151 and 152 move outwardly under their individual centrifugal force pattern, so as to supply separate fluid pressure rise resultants termed G-1 and G-2, these pressures being fed to the various valve portions heretofore stated. Each governor valve provides a separate speed rise effect which is used to raise the shifter valves 220, 251, 276 of Figure 6 against the forces opposing the governor upshift action. The larger, inner radial bosses of the governor valves 151, 152 are subject to the pressure delivered to lines 321, 322 of Figures 6 and 7, which pressure opposes the centrifugal force of the valves, in order to meter the governor delivered control pressure in the desired manner.

Throttle valve pressure

A second metering valve, termed a throttle valve or T-V valve 209 shown in Figure 5, is utilized to deliver a metered pressure which varies in accordance with the position of the vehicle throttle opening. This metered throttle valve pressure output, which increases as the engine intake manifold pressure decreases, is utilized to oppose upshift of the automatic shift valves and to assist in the application of the front and rear band servo units. T-V pressure is also applied to chamber 211 one end of a so-called double transition valve 210 for purposes hereafter more fully explained.

Primary unit manually operated valve

The primary unit manually operated valve 170 is shown in detail in Figure 5. The valve is positioned manually by a driver operated control lever 400 of Figure 12 and may be positioned for F-1 or normal forward drive position, F-2 or modified forward drive position, neutral or reverse. See Fig. 15.

The valve bore includes thirteen ports 171, 172, 173, 174, 176, 177, 178, 179, 180, 181, 183, 184 and 185. Port 171 is an exhaust port leading to the sump of the front unit. Port 172 leads to passage 311, the latter passage leading to the pressure supply ports 263 and 287, respectively, of the 2nd to 3rd and 3rd to 4th shift valves (see Figure 6). Port 173 communicates with pump pressure feed passage 310. Port 174 feeds pump pressure to pressure input passage 175 of the throttle valve 209. Port 176 admits pump pressure from passage 310 to the bore of valve 170. Port 177 communicates with rear band release passage 316. Port 178 communicates with rear clutch apply passage 318 and with passage 317 leading to port 264 of the 2nd to 3rd shift valve 251. Port 179 connects to front band apply passage 315. Port 180 admits pump pressure from supply passage 310 to the valve bore. Port 181 connects to passage 182 leading to port 199 of the throttle valve 209. Port 183 connects to passage 332 leading to port 257 of the 2nd to 3rd shift valve regulator plug 250. Port 184 connects to passage 327 leading to port 301 of reverse delay valve 306. Port 185 exhausts to the primary transmission sump.

The valve 170 body includes four lands 186, 187, 188 and 189 joined by valve stem portions of reduced cross-section. A boss 190 of lesser diameter than land 186 extends outwardly from land 186, the boss including a tapered portion 191 on the end thereof. A pair of bosses 192 and 193 are arranged to receive pin 194 adapted to be moved by the manually operated selector lever 400 (see Figure 12) under control of the vehicle operator. The primary unit manually operated valve 170 may be positioned for two forward operating conditions, F-1 and F-2, and for neutral and for reverse.

Throttle valve

The throttle or T-V valve is a pressure metering valve which functions, when the manually operated valve 170 is placed in the F-1 position, to meter pressure fluid to the automatic shift valves 220, 251 and 276, to the front and rear band apply servos 110 and 135, and to one end of a double transition valve 210. The double transition valve 210 is a valve utilized to accomplish shift from second to third gear ratio, during which shift a double shift is necessary. On shifting from second to third gear ratio, a double transition is accomplished, there being a shift in gear ratio of both front and rear planetary gearing units. During shifts from first to second and third to fourth, shifting is accomplished by a single transition, there being a shift in only one of the planetary gearing units. When the valve 170 is positioned for F-2 or shift delay operation, the T-V valve does not meter pressure but delivers full line pressure to the afore-mentioned places.

The throttle valve is provided with eight ports. Port 192 exhausts to the primary transmission unit sump. Ports 193, 194 and 195 communicate with T-V pressure delivery passage 312. Port 196 connects to passage 175 to admit pump line pressure to the T-V valve. Port 197 exhausts to sump. Port 198 communicates with passage 326 leading to port 285 of the 3rd to 4th shift valve regulator plug 275. Port 199 admits line pressure from passage 182 to the valve bore.

The throttle valve body includes four lands 200, 201, 202 and 203 joined by reduced stem sections and valve stem 204 extending outwardly from the valve bore fastened to a piston 205 located in a cylinder 206. Piston 205 is spring loaded by spring 207 to yieldably bias the valve body to a position wherein the throttle valve delivers metered throttle pressure to passage 312, the spring being effective to establish communication between ports 196 and 195. Chamber 208 of cylinder 206 is placed in communication with the intake manifold of the vehicle internal combustion engine by tubing (not shown) so that engine manifold vacuum acts upon piston 205 in opposition to spring 207. When the engine manifold vacuum is high, as with a closed carburetor throttle valve, the vacuum is effective to cause piston 205 to compress spring 207 and move to the right, thereby reducing or cutting off T-V pressure. Land 201 may close off port 195 from port 196 when the engine idles. As the vehicle throttle valve is opened to increase engine power, the vacuum acting upon piston 205 diminishes and permits the spring to move the valve body to the left to increase throttle valve delivered pressure output to passage 312. Thus, the T-V pressure increases as the vehicle throttle is opened, and is a metered pressure depending upon manifold vacuum as expressed by the degree of throttle opening, and may vary from zero with a closed throttle to maximum line pressure with a fully opened throttle. Port 194 permits T-V pressure to react upon land 201, this pressure acting in assistance to vacuum acting upon piston 205. The land 201 is of larger effective area than land 200.

Thus, when the valve 170 is positioned for F-1 operation as shown in Figure 5, the T-V valve functions as a pressure metering valve, the pressure level of the T-V pressure being a function of engine intake manifold vacuum.

When the valve 170 is positioned for F-2 operation, line pressure is admitted by way of passage 182 to act upon land 203, this pressure exerting a force sufficient to overcome the effect of engine manifold vacuum and, together with spring 207, being effective to force the throttle valve to the left to its full delivery position. Thus, when the valve 170 is positioned for F-2 operation, the throttle valve does not function as a pressure metering valve, but delivers full pump line pressure irrespective of the degree of engine vacuum.

Double transition valve

A double transition valve 210 includes a valve bore having five ports. Port 211 connects to throttle valve output passage 312. Port 212 connects to passage 325 leading to port 288 of the 3rd to 4th shift valve. Port 213 communicates with front clutch apply-front band release passage 319. Port 214 communicates with passage 320 leading to the pressure delivery port 231 of the 1st to 2nd shift valve. Port 215 connects to rear band release passage 316. In first and second gear ratios, passage 316 is exhausted and T-V pressure is effective to position the double transition valve as shown in Figure 5, and establishes communication between passage 213 and 214. In third and fourth gear ratios, pressure in passage 316 is effective to move the valve to the left, thereby establishing communication between passages 212 and 213. The valve body includes a pair of lands 216 and 217 joined by stem portion 218 of reduced cross-section. It will be noted that lands 216 and 217 are of different area so that pressure acting upon land 217 is effective to overcome T-V pressure acting upon land 216.

Automatic shift valves

Figure 6:
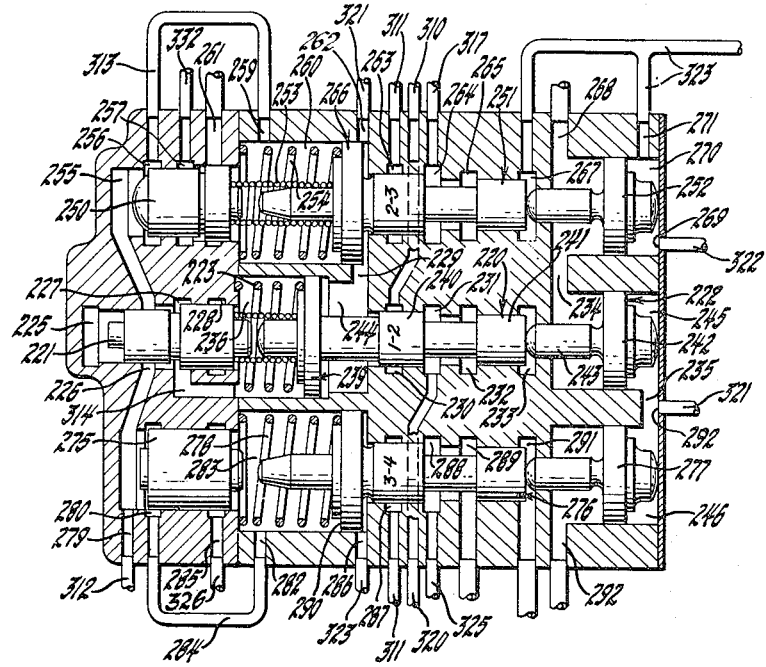
Figure 6 is a partially sectional view of the fluid pressure controlled shift valves of the primary transmission unit illustrating the valves and porting in detail.

In Figure 6, the details of the three automatic shift valves are shown. The valves are illustrated in their "down" or low gear selecting position. The forces tending to "downshift" each valve are the springs and T-V pressure. The force tending to upshift each valve is the governor output pressure. The 1st and 2nd shift valve 220 is acted upon by G-1 pressure above. The 2nd to 3rd and 3rd to 4th shift valves are acted upon by both G-1 and G-2 pressure.

1st to 2nd shift valve

The 1st to 2nd shift valve assembly includes a T-V regulator plug 221, a valve body 220 and a governor plug 222. A spring 223 yieldably urges the valve body to its down or low gear selecting position. The assembly bore includes eleven ports 225, 226, 227, 228, 229, 230, 231, 232, 233, 234, and 235. Port 225 exhausts to the transmission sump. Port 226 establishes communication between T-V pressure feed passage 312 and large chamber 236, by way of port 227 and passage 314. Port 228 exhausts to sump. Port 229 connects to G-1 pressure feed passage 321. Port 230 communicates with line pressure input passage 310. Port 231 connects to passage 320 leading to the double transition valve. Ports 232, 233 and 234 each exhaust to sump. Port 235 connects to G-1 pressure feed passage 321. The T-V plug 221 includes a pair of lands of different area. When no T-V pressure exists in passage 312, a spring 235 is effective to move the T-V plug to the left to connect chamber 236 to exhaust port 228. When T-V pressure exists in passage 312, this pressure, acting upon the end of land 221 is effective to move the plug to the right to cut off exhaust port 228 and admit T-V pressure to chamber 236.

The valve body includes large piston 239 and lands 240 and 241. The governor plug 222 includes a piston 242 having a stem 243 contacting the end of the valve body 220. G-1 pressure acting in chambers 244 and 245 is, at some vehicle speed, effective to overcome the effect of spring 223 and T-V pressure in chamber 236 to cause upshift of the valve body. The areas and spring force are calculated so that this may occur at any predetermined vehicle speed, but the vehicle speed at time of upshift varies in accordance with T-V pressure. The T-V pressure is greater as the vehicle throttle is opened. Thus a higher vehicle speed is required to upshift to second speed with a wide open throttle than is the case of a fully retarded throttle. With the valve in its "down" position shown, and with the double transition valve positioned for first or second gear operation as shown (see Figure 5), no line pressure can be admitted to front clutch apply-front band release passage 319. Line pressure from pump pressure feed passage 310 is blocked off by land 240 and passage 320 is connected to exhaust port 232.

When the governor pressure in passage 321, termed G-1 pressure, is sufficient to cause upshift of the 1st to 2nd valve, pressure feed passage 310 is connected to passage 320, this pressure being fed to front clutch apply-front band release passage 319 to release the front unit band and apply the front unit clutch, thus placing the front unit in second gear ratio.

2nd to 3rd shift valve

The 2nd to 3rd shift valve assembly includes a T-V plug 250, 2nd to 3rd shift valve body 251, and governor plug 252. A pair of springs 253 and 254 yieldably urge the 2nd to 3rd shift valve to its down or "low gear" selecting position. The assembly bore includes 13 ports. Port 255 connects to T-V feed passage 312. Port 256 communicates with branch passage 313 which, in turn, connects to port 259 to admit T-V pressure to chamber 260. Port 257 connects to passage 332, controlled by port 183 of manual valve 170. Ports 261 and 265 exhaust to sump. Port 262 admits G-1 pressure from passage 321 to the chamber behind piston 266. Port 263 is the line pressure feed input port. Port 264 connects to passage 317 leading to rear clutch apply passage 318 and to port 178 of the valve 170. Port 267 communicates with G-2 pressure feed passage 323, admitting G-2 pressure to the chamber at the end of the 2nd to 3rd shift valve body 251. Port 268 exhausts to sump. Port 269 admits G-2 pressure from passage 322 to chamber 270 behind governor plug 252, and port 271 connects to G-2 feed passage 323 leading to port 267 of the 2nd to 3rd shift valve and to port 286 of the 3rd to 4th shift valve, see Fig. 6.

The G-1 and G-2 pressures at some vehicle speed, and depending upon the amount of T-V pressure acting in chamber 260, will be effective to upshift the 2nd to 3rd shift valve to select third speed gear ratio. The valve is illustrated in second speed position. In this position the rear clutch apply passage 318 is exhausted to sump through port 265. When the 2nd to 3rd valve "upshifts," pressure from passage 310 is admitted to passage 317 to apply the rear clutch.

3rd to 4th shift valve

The 3rd to 4th shift valve assembly incldes a T-V regulator plug 275, shift valve body 276 and governor plug 277, a spring 278 yieldably urges the valve to its down or third speed position. The assembly bore is provided with eleven ports. Port 279 admits T-V pressure to the left of the T-V regulator plug 275. Port 280 communicates with port 282 by way of passage 284 to admit T-V pressure to chamber 283. Port 285 is connected to port 198 of manual valve 170 by way of passage 326. Port 286 admits G-2 pressure from passage 323 to the chamber behind large piston 290. 287 is the pump line pressure input port. Port 288 communicates with port 212 of the double transition valve by way of 3rd to 4th delivery passage 325. Ports 289 and 291 exhaust to sump. Port 292 admits G-1 pressure beneath governor plug 277.

Again, at some vehicle speed, which varies in accordance with T-V pressure, input pressure to the T-V governor plug and chamber 283, governor output G-1 acting in chamber 246 and G-2 pressure acting behind piston 290 acting in opposition to the throttle valve pressure acting upon governor plug 275 and in chamber 283 will be effective to upshift the valve 276 for selection of fourth speed gear ratio. In the position illustrated, the valve is in its third speed position. Passage 325 is exhausted to sump through port 289. When the valve upshifts, pressure feed passage 311 is connected to passage 325 leading to the double transition valve.

Reverse clutch timing valve

A reverse clutch timing valve 293 shown in Figure 5 is utilized to prevent actuation of the reverse cone clutch when the vehicle is moving forwardly at a speed greater than a predetermined speed, for example three miles per hour. This is a safety feature which prevents damage to the transmission in the event that the manual valve is accidently or inadvertently positioned for reverse when the vehicle is operating at high speed.

The valve body includes a pair of lands 294 and 295 joined by reduced body portion 296 and a stem 297 extending outwardly from the valve casing. Stem 297 contacts boss 191 of valve 170 whenever said valve 170 is in any position other than reverse.

The valve bore is provided with seven ports 300, 301, 302, 303, 304, 305 and 306. Port 300 connects chamber 307 beneath one end of land 294 to G-1 pressure feed passage 321. Port 301 connects to reverse pressure feed passage 327, the latter passage being controlled by the manual valve. Port 302 connects to reverse cone feed passage 328. Ports 303 and 304 communicate with each other by way of passage 308. Port 305 admits pressure from port 304 to passage 329 leading to chamber 330 of pressure control plug 331 of the variable capacity pump. 306 is an exhaust port leading to sump. A spring 309 yieldably urges the valve body to a position wherein land 293 covers exhaust port 306.

Operation of the primary transmission unit

The manually operated valve 170 for selecting the operation of the primary transmission unit may be selectively positioned by the operator to choose neutral, F-1, F-2, and reverse condition of operation. In both F-1 and F-2, four forward gear ratios may be obtained, but the timing of the shift with respect to vehicle speed, will be different in the F-1 and F-2 conditions of operation.

Neutral

With the valve 170 positioned for neutral, all of the bands and clutches are released so that no torque may pass through the primary unit.

Figure 7:
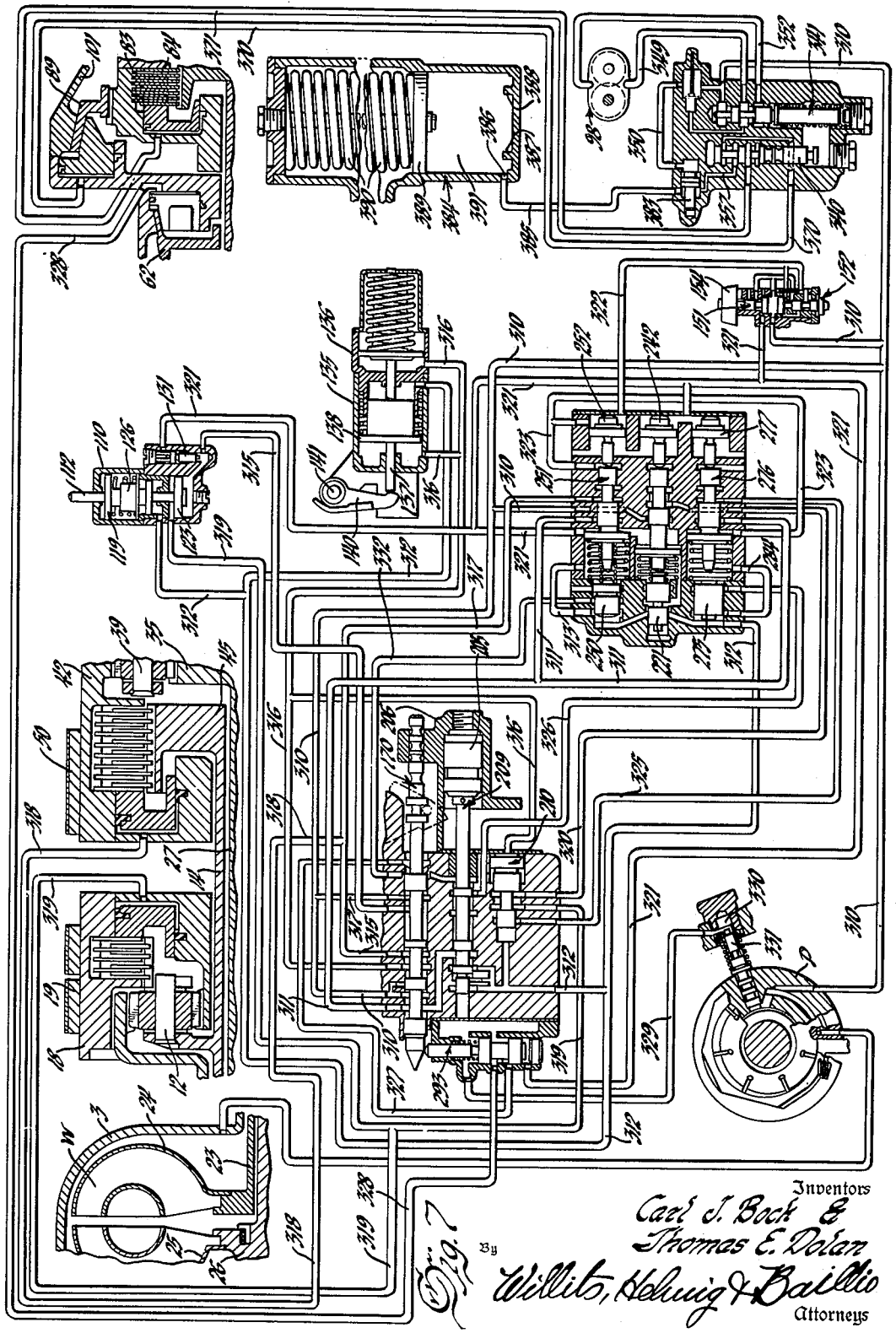
Figure 7 is a schematic diagram of the transmission control system.
Figure 8:
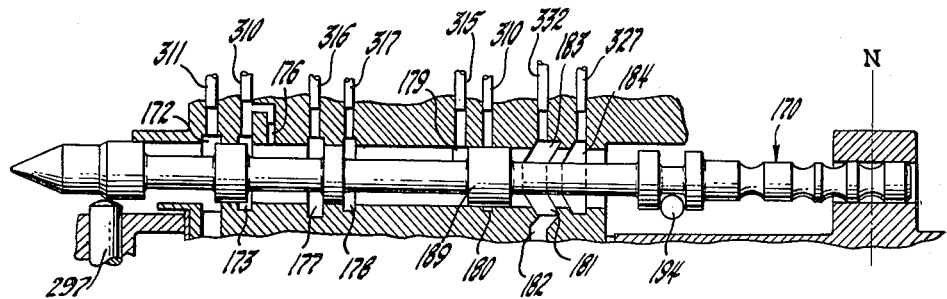
Figure 8 is a partially sectional view of the manually operated valve for controlling the primary transmission unit, and illustrating the valve as positioned for neutral or no-drive operation of the primary transmission unit.

In Figure 8, the valve 170 is illustrated in neutral. Pump line pressure from supply passage 310 is blocked off at port 180 by land 189. Pump line pressure from passage 310 is admitted to rear band release passage 316 by way of ports 176 and 177. This pressure acting in chambers 142 and 141 forces pistons 138 and 139 to compress the rear band applying springs and releases the rear band. Front band apply passage 315 is connected to passage 317 by way of ports 179 and 178. This passage 317 is exhausted to sump by way of exhaust port 265 of 2nd to 3rd shift valve 251 of Figure 6. The rear clutch apply passage 318 branched to passage 317 as shown in Figure 7 is likewise exhausted to sump through port 265 of valve 251 of Figure 6. Front band release-front clutch apply passage 319 of Figures 7 and 5 is connected to passage 320 by ports 213 and 214 of valve 210 of Figure 5, the passage 320 being exhausted to sump through port 232 of 1st to 2nd shift valve 220 of Figure 6.

With all of the bands and clutches released, the transmission is in neutral.

F-1 operation

With the valve 170 positioned for F-1 operation, four forward gear ratios may progressively be obtained. The valve 170 is shown positioned for F-1 operation in Figures 5 and 7. Assuming the vehicle is being started from a standing start, the automatic shift valves 220, 251 and 276 will be in the "down" position illustrated. The governor pressures G-1 and G-2 are initially zero since the power output shaft is standing still. The springs associated with the various shift valves 220, 251 and 276 are effective to initially position the valves 220, 251 and 276 as illustrated.

Pump line pressure from passage 310 is fed to ports 173, 176 and 180.

Line pressure from passage 310 is admitted through ports 173 and 172 of the manual valve 170 to the passage 311 leading to the 2nd to 3rd and 3rd to 4th shift valves 251, 276, supply ports 263 and 287, respectively, and is admitted by port 174 to passage 175 leading to the T-V valve supply port 196 as heretofore explained. Spring 207 tends to move the T-V valve 209 to the left, while engine manifold vacuum acting upon piston 205 tends to move the T-V valve 209 to the right. As the vehicle throttle is opened, manifold vacuum diminishes, thereby enabling the T-V valve 209 to deliver a metered pressure from port 196 to port 195 and to T-V delivery passage 312. This T-V output pressure reacts upon land 201 by way of port 194, tending to cause the T-V valve 209 to cut off its output pressure. The T-V pressure, which increases as the vehicle throttle opens due to drop in manifold vacuum, is directed to one end of double transition valve 210, to chamber 114 of front band apply servo and to chamber 146 of rear band apply servo. The T-V pressure directed to the band apply servos applies a force which increases as the vehicle engine throttle is opened to prevent slippage of the bands under high torque transfer condition of operation. T-V pressure is also directed to shift valve regulator plugs 275, 221 and 250 and to chambers 283, 236 and 260 of valves 276, 220 and 251, respectively. The pressure is admitted to chamber 283 by way of passage 284, to chamber 236 by way of passage 314 and to chamber 260 by way of passage 313. This T-V pressure delays the time of upshift of the valves, since the greater the T-V pressure, the higher the governor pressure required to accomplish upshift. With a closed or partially closed throttle, upshift of the valves 220, 251 and 276 will occur at lower vehicle speeds than is the case of full throttle operation.

Pump line pressure from passage 310 is directed through ports 173 and 174 of the manual valve to passage 311 leading to the pressure supply ports 263 and 287 of the 2nd to 3rd and 3rd to 4th shift valves 251 and 276, respectively. The 1st to 2nd shift valve supply port 230 is fed directly from pump pressure supply passage 310. Since all of the valves are initially placed in their down position as illustrated, the pressure is blocked at each of the feed ports 230, 263 and 287. Pump pressure is fed to front band apply passage 315 by way of passage 310 and ports 180 and 179 of the manual valve 170. This pressure, acting in chamber 125 of the front band servo forces piston 123 upwardly to apply the front band.

Rear band release passage 316 is exhausted to sump by way of passage 317, ports 177 and 178 of the valve 170, and passage 317 leading to port 264 of the 2nd to 3rd shift valve 251. With the 2nd to 3rd shift valve positioned as shown, port 264 communicates with exhaust port 265. The springs of the rear band servo are effective to apply the rear band. Rear clutch apply passage 318 is also exhausted by way of exhaust port 265 of the 2nd to 3rd shift valve 251. Front clutch apply-front band release passage 319 is exhausted to sump by way of ports 213 and 214 of double transition valve 210 and passage 320 leading to port 231 of the 1st to 2nd shift valve 220. With the 1st to 2nd shift valve down as shown, port 231 communicates with exhaust port 232.

With the front and rear bands applied and with the front and rear clutches released, the primary transmission unit is conditioned for first or low gear operation.

Assuming an increase in vehicle speed in first gear ratio, the governor delivery passage 321 delivers G–1 pressure to port 262 of 2nd to 3rd shift valve 251, to chambers 244 and 245 of 1st to 2nd shift valve 220 and to chamber 246 of 3rd to 4th shift valve 276. This pressure tends to upshift all of said valves, but due to the proportioning of the areas of the regulator plugs 221, 250 and 275 effected by T–V pressure, and due to the proportioning of the area of governor plugs 222, 252 and 277 effected by governor pressure, and due to the proportioning of the forces of the springs 223, 254 and 278 acting upon the valves, the valves will upshift progressively. When sufficient vehicle speed is obtained, G–1 pressure acting upon areas 239 and 242 will be effective to overcome the effect of T–V pressure acting upon regulator plug 221 and in chamber 236, and the force of spring 223. The 1st to 2nd valve 220 will thereupon upshift, blocking off exhaust port 232 and admitting line pressure from port 230 to front clutch apply-front band release passage 319 by way of passage 320 and ports 214—213 of the double transition valve. It will be noted that T–V pressure acting upon double transition valve 210 maintains the double transition valve in its down position to establish communication between passage 320 and passage 319. Line pressure from passage 319 is applied to chamber 20 to apply the front clutch and to chambers 124 and 120 of the front band servo to release the front band. The front band will be released even though line pressure is supplied to front band apply passage 315, since the effective arms of chambers 124 and 120 and the effect of spring 128 is greater than the effect of line pressure in chamber 125 and T–V pressure in chamber 114. With the front clutch and rear band applied and the front band and rear clutch released, the transmission is in second speed gear ratio.

Upon a further increase in vehicle speed, G–1 pressure admitted from passage 321 to port 262 and G–2 pressure admitted from passage 322 to chamber 270 and by passage 323 to port 267 becomes effective to overcome the force of T–V pressure acting upon regulator plug 250 and in chamber 260 and the force of springs 253 and 254 of the 2nd to 3rd shift valve 251. The 2nd to 3rd shift valve thereupon upshifts, blocking off exhaust port 265 and admitting pump pressure from passage 311 to passage 317. This pressure is directed by way of rear clutch apply passage 318 to chamber 46 of the rear clutch, applying the clutch. The pressure is also directed by way of ports 178 and 177 of the manually operated valve 170 to rear band release passage 316, and hence to chambers 142 and 146 of the rear band servo. The pressure in chambers 142 and 146 force pistons 138 and 139 to compress the rear band apply springs and release the rear band.

It will be noted that when line pressure is admitted to rear band release passage 316, this pressure is also directed to one end of double transition valve 210, thereby moving valve 210 to the left and connecting front clutch apply-front band release passage 319, by way of ports 213 and 212 of the double transition valve to passage 325 leading to port 288 of the 3rd to 4th shift valve 276. Port 288 communicates with exhaust port 289 of the 3rd to 4th shift valve. With the front clutch released and with the front band release passage exhausted, line pressure in front band apply passage 315 is effective to apply the front band. With the front band and rear clutch applied, the transmission is conditioned for third gear ratio operation.

Further acceleration in third gear will build up the G–1 and G–2 pressures acting in chambers 246 and upon piston 290 of the 3rd to 4th shift valve 276 until these pressures are effective to overcome the effect of T–V on regulator plug 275 and in chamber 283 and the force of spring 278, causing the 3rd to 4th shift valve 276 to upshift, thereby blocking off exhaust port 289 and admitting line pressure from port 287 to passage 325 leading to port 212 of the double transition valve 210. Since the double transition valve is moved up by pressure in passage 316, pressure from passage 325 is admitted through the double transition valve port 213 to front clutch apply-front band release passage 319. Pressure in chamber 20 applies the front clutch, while pressure in chambers 124 and 120 of the front band servo releases the front band. With the front and rear clutches applied and with the front and rear bands released, the primary transmission unit is conditioned for fourth gear or direct drive operation.

With the valve 170 in the F–1 position, the T–V pressure varies in accordance with vehicle engine throttle opening, being minimum with closed throttle and maximum with open throttle. It will be apparent therefore, that both the T–V pressure tending to downshift the automatic shift valves and the governor pressures tending to upshift the valves are both variables, the T–V pressure increasing with throttle opening, and the governor pressures increasing with vehicle speed. The timing of the shifts therefore depends upon both vehicle speed and throttle opening. With a closed throttle the shifts will occur at a much lower vehicle speed than is the case with an open throttle.

*F–2 operation*

Figure 9:
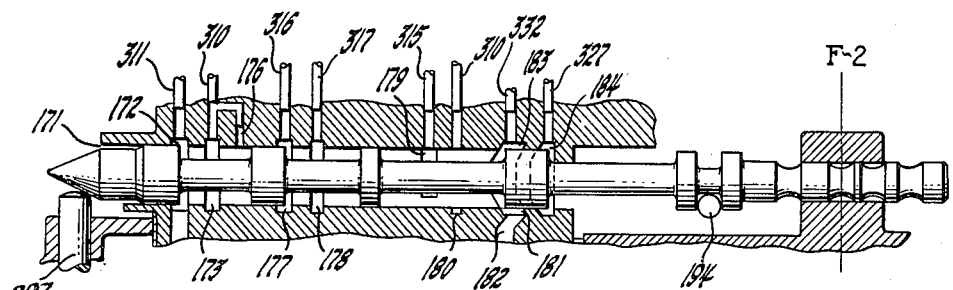
Figure 9 is a view similar to Figure 8, illustrating the manually operated valve as positioned for shift-delay or second forward position hereafter termed as F-2 for F-2 operation of the primary transmission unit.
Figure 10:
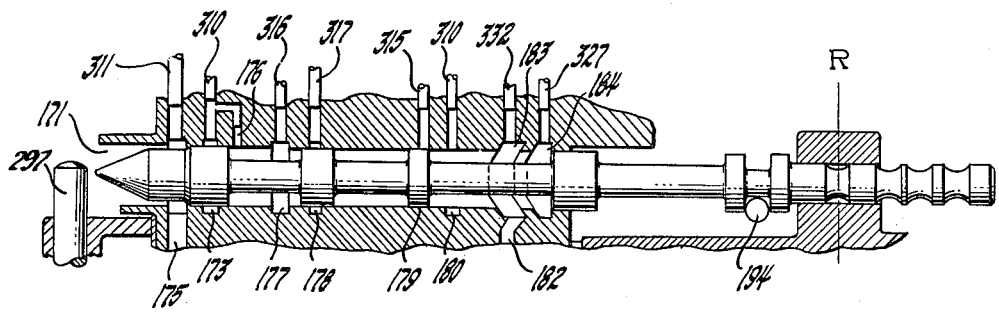

The position of the primary unit manually operated valve 170 for F–2 operation is shown in Figure 9. With the valve 170 thus positioned, port 180 is placed in communication with port 181, thereby admitting line pressure to passage 182 and to port 199 of the T–V valve 209. This pressure acting upon the end of the T–V valve is effective to force the T–V valve to the left to establish communication between passage 175 and passage 312. Full pump pressure will therefore exist in passage 312 at all times, irrespective of the amount of throttle opening. The metered T–V pressure, which varies with engine intake manifold pressure when the manual valve 170 is placed in the F–1 position, is therefore replaced by full line pressure when the valve 170 is placed for F–2 operation. In addition, full line pressure is admitted from port 199 to port 198 and passage 326 leading to port 285 of the 3rd to 4th shift valve regulator plug 275. In addition, with the valve 170 positioned for F–2 operation, line pressure is admitted to port 257 of the 2nd to 3rd shift valve regulator plug 250 by way of passage 332, by way of ports 180 and 183 of the manually operated valve 170. This pressure, acting upon the 2nd to 3rd and 3rd to 4th shift valve regulator plugs 250, 275, delays the time of upshift from third to fourth speeds and prevents "hunting" or too rapid shifts between third and fourth gear ratios under certain conditions of vehicle operation.

The useful result obtained is that the transmission upshift is delayed to correspond to full throttle upshift irrespective of the position of the vehicle engine throttle. More particularly, as heretofore explained, pump line pressure acting on land 203 of throttle valve 209 positions valve 209 to deliver full pump line pressure to the regulator plugs 221, 250 and 275 of the shift valves 220, 251 and 276 at all times even though the engine throttle may be fully retarded. Thus, manually operable valve 170 constitutes an overcontrol for throttle valve 209, positioning valve 209 to deliver full pump line pressure irrespective of the degree of vacuum acting upon piston 205 of valve 209. This is particularly beneficial in transmission installations in heavy duty vehicles, such as trucks and busses. In descending long or steep grades with heavy vehicles, it is desirable to delay the transmission upshift, even though the engine throttle may be closed, to provide for maximum engine braking effect. At the same time, it is necessary to allow transmission upshift at progressively higher vehicle speeds in order to protect the vehicle engine. If the transmission were locked in low gear, for example, and the vehicle were to descend a long or steep grade, the engine might be driven at a sufficiently high number of revolutions per minute to critically damage or reduce the useful life of the engine. By admitting full pump line pressure from passage 312 to the shift valves to act in opposition to the governor pressures tending to upshift the valves, a substantially higher governor pressure, corresponding to higher vehicle speed, is required to cause upshift. This provides maximum engine braking effect irrespective of engine throttle position. At the same time, the vehicle operator is prevented from maintaining the transmission in too low a gear ratio for a given vehicle speed. The vehicle engine is therefore automatically protected from damage due to being driven at excessive revolutions per minute even when the engine is being used for braking effect. The transmission will automatically progressively upshift through the four gear ratios to reduce engine revolutions per minute when the governor pressure are sufficient to overcome the effect of line pressure admitted by the T–V valve.

The upshift operation is the same as described in connection with F–1 operation, except that the engine intake manifold pressure has no effect upon the time at which the shift occurs. Upshifting of the automatic shift valves is strictly a function of vehicle speed as expressed by the governor output pressures.

Reverse operation

The position of the primary unit valve 170 for reverse operation is illustrated in Figure 10. For reverse, the front unit band 19 and reverse cone brake 65 are engaged.

As shown in Figure 10, the valve 170 is positioned out of contact with reverse inhibiter valve stem 297. In the event that the vehicle is standing still, or in forward motion at a very low speed, spring 309 is effective to move the valve 293 to a position wherein land 295 blocks off exhaust port 306 and admits line pressure from passage 327 to reverse cone clutch apply passage 328. Passage 327 is supplied with line pressure by way of ports 180 and 184 of the manually operated valve 170. Pump line pressure is also directed to passage 329 leading to chamber 330 of the pressure regulator plug 331 of the variable capacity pump by way of ports 303, 304 and 305 of the reverse clutch timing valve to raise the line pressure for reverse operation.

In the event that the vehicle is in forward motion above a predetermined speed, G–1 pressure supplied by passage 321 to chamber 307 of the reverse blocker valve 293 is effective to move the valve against spring 309, thereby connecting pressure feed passage 327 to exhaust port 306, to prevent supply of pressure to reverse cone apply passage 328. In this manner, application of the reverse cone clutch is prevented in the event that the valve 170 is accidently positioned for reverse when the vehicle is traveling forwardly with sufficient speed to damage the transmission by application of the reverse cone clutch.

Auxiliary planetary control

The auxiliary planetary unit is arranged for operation so that either cone brake 89 is applied for reduction drive through the auxiliary unit or clutch 83, 84 is engaged for direct drive through the auxiliary unit.

The auxiliary unit control system includes a manually operated control valve 340 adapted to be positioned for either direct or reduction drive, a pressure regulator valve 341, a pair of check valves 342 and 343, a tail shaft driven pump 98 and an accumulator 384. Valve 340 is operated through a linkage mechanism (see Figures 12 through 15) under the control of the vehicle operator.

Pressure regulator valve

The pressure regulator valve 341 is fed with supply pressure from both the engine driven pump and the load shaft driven pump. The valve 341 bore is provided with four ports 345, 346, 347 and 348. Line pressure from front pump delivery passage 310 is supplied to port 345. Line pressure from pump 98 is supplied to port 346 by means of passage 349. Port 347 admits line pressure to passage 351 leading to one end of check valve 342. Port 348 exhausts to sump by way of passage 352. The valve body includes a pair of lands 353 and 354 joined by reduced stem 355. A spring 356 yieldably biases the valve body against the effect of front pump line pressure acting upon land 353.

Manually controlled valve

The manually operated control valve 340 is provided with a bore having five ports 360, 361, 362, 363 and 364. Port 360 exhausts to sump. Port 361 communicates with reduction cone brake feed passage 370. Port 362 communicates with pressure supply passage 357. Port 363 communicates with direct clutch supply passage 371. Port 364 exhaust to sump. The valve body includes three lands 366, 367 and 368 joined by reduced stem portions and controls the admission of pressure to and exhaust of pressure from the direct drive clutch supply passage 371 and reduction drive supply passage 370. A valve body stem 369 extends outwardly from the bore and the position of the valve in the bore is controlled by means of a lever 425.

Check valve 342 includes a valve bore having ports 375, 376 and 377 and a valve member 342 on stem 378. A spring 379 yieldably urges the valve to a closed position.

Check valve 343 includes a valve bore having ports 380, 381 and 382 and a valve member 343 on stem 383. A spring 384a yieldably urges the valve towards a closed position.

Ports 375 and 376 of valve 342 admit line pressure from front pump supply passage 310 to port 380 of check valve 343 by way of passage 350. Port 377 of valve 342 communicates with pressure regulator valve port 347. Port 382 of check valve 343 is connected to an accumulator 384 by way of passage 385. Port 381 connects to pressure supply port 362 of manually operated valve 340 by way of passage 357.

Accumulator

A pressure accumulator 384 is used to insure quick action in the actuation of the auxiliary unit direct drive and reduction drive cone brake and clutch members. Due to the volumetric capacity of these units, an undesirable pressure drop may occur momentarily when shifting of the auxiliary unit is called for, in the absence of the accumulator. Such a result is undesirable in that it may permit excess engine speed up and consequent rough clutch and brake application.

The pressure accumulator housing 384 is formed to provide a cylinder having port 386 in the side wall thereof and a pair of raised bosses 387 and 388 at one end of the housing and extending inwardly into the cylinder. A piston 389 is positioned for sliding motion in the cylinder housing, and is spring loaded by a spring 390. Passage 385 connects to the accumulator check valve 343. Bosses 387 and 388 prevent piston 389 from blocking off port 386 when the piston is in its lowest position.

Operation of the auxiliary unit control system

Pressure from front pump supply passage 310 passes through ports 375 and 376 of check valve 342 to port 380 of check valve 343. This pressure is also fed to port 345 of pressure regulator valve 341. Pressure from load shaft driven pump is fed by passage 349 to port 346 of the pressure regulator valve and by way of passage 351 to port 377 of check valve 342. It will be noted that the pressure regulator valve position in its bore is determined by the forces acting upon the top of land 353 and the counter-force of spring 356.

With the vehicle operating at low vehicle speed, the output of the load shaft driven pump will be relatively low with respect to that of the engine driven pump. Front pump pressure supplied to port 345 will cause the valve body to compress spring 356 and crack open exhaust port 348. Passage 351 will be connected to exhaust by way of port 348, and check valve 342 will close. The pressure supplied to passage 357 will be entirely furnished by the front pump.

As the vehicle speed increases, the rear pump increases its output relative to that of the front pump, this pressure being supplied to port 346 of the regulator valve and to port 377 of the check valve 342. In the event that front pump output is reduced or is zero, or is reduced a sufficient amount below that supplied by the rear pump, the tail shaft pump pressure will open check valve 342 and said pressure will be supplied to passage 350 and passage 357. Pressure in passage 350, acting upon the end of check valve 343, moves valve 343 against spring 384a to admit pressure from passage 350 to passage 357 by way of ports 380 and 381 of valve 343.

The tail shaft pump is used to supply pressure for operating both the primary unit and secondary unit servos in the event that the front pump is disabled. Thus, in pushing the vehicle to start the vehicle engine, no front pump pressure would exist and all pressure would be supplied by the tail shaft driven pump.

Pressure supplied by passage 350 to port 380 of check valve 343 normally is effective to open the check valve so as to be admitted to manually operated valve pressure feed port 362 and also to be admitted to accumulator supply passage 385. In the event that line pressure is unusually low, as might be the case with a vehicle standing with the engine idling, check valve 343 will momentarily close and pressure will be supplied to passage 357 by means of the accumulator.

The auxiliary unit manually operated valve 340 is positioned either for direct drive or reduction drive of the auxiliary unit. It is shown positioned for reduction drive. Line pressure from supply passage 357 is admitted to the reduction cone cylinder chamber 94 (see Figure 1a) by way of ports 362 and 361 of the manually controlled valve and passage 370. At the same time, direct clutch supply passage 371 is exhausted to sump by way of ports 363 and 364.

With the auxiliary unit valve 340 positioned for direct drive, the valve body is moved upwardly so that land 368 blocks off exhaust port 364 and land 366 opens exhaust port 360. Pressure is admitted to direct drive clutch supply passage 371 by way of ports 362 and 363. Reduction cone supply passage is exhausted to sump through ports 361 and 360.

In the operation of the primary unit valve 170 and auxiliary unit valve 340, a control linkage is arranged so that the auxiliary unit valve 340 may be shifted only when said primary unit valve 170 is positioned for neutral. Thus at the time of shifting of the auxiliary unit, no torque is being transferred through the transmission. This linkage is shown in Figures 12 through 15.

The control system for positioning the valves 170 and 340 of the primary and auxiliary transmission units is shown in Figures 12, 13, 14 and 15. A common operating member or selector lever 400 is mounted upon a control column 401 for both reciprocatory and lateral motion. A control column cover plate 402 is provided with guide slots 403, 404 and 405 for guiding the motion of control lever 400 which extends upwardly from the casing. A hub member 406 is supported in bearing 407 for reciprocatory motion with respect to the control column 401. Hub 406 carries a U-shaped support member 408, the latter member providing support for a rock-shaft 409 for providing lateral motion of the control handle. The common operating member is formed of a stub base 410 mounted upon rock-shaft 409 and a control handle 411 including a housing portion 412 slidably positioned over stub base 410. A spring 413 urges the housing portion 412 outwardly from the base portion to place stop-pin 414 into contact with the under surface of the cover. A series of notches are provided in the underside of the control column cover, the notches corresponding to the various operative positions of the primary unit manually operated valve 170 and cooperating with stop-pin 414 to retain the control handle in the operative position selected by the vehicle operator.

At the bottom of stub base 410 there is a lever 415 fixedly mounted to the base and rotating with the stub base as the control handle is moved to select the various operative positions of shift valve 170. Reciprocatory motion of control handle 411 in guide slots 403 and 405 results in rotary motion of the U-shaped bracket 408, the stub shaft and lever 415 in bearing 407. A link 416 connects lever 415 to a lever 417 fixed to control shaft 418. The control shaft 418 has fixed thereon a lever (not shown) for moving a control pin 194 (see Figure 5) for positioning the shift valve 170.

Figure 11:
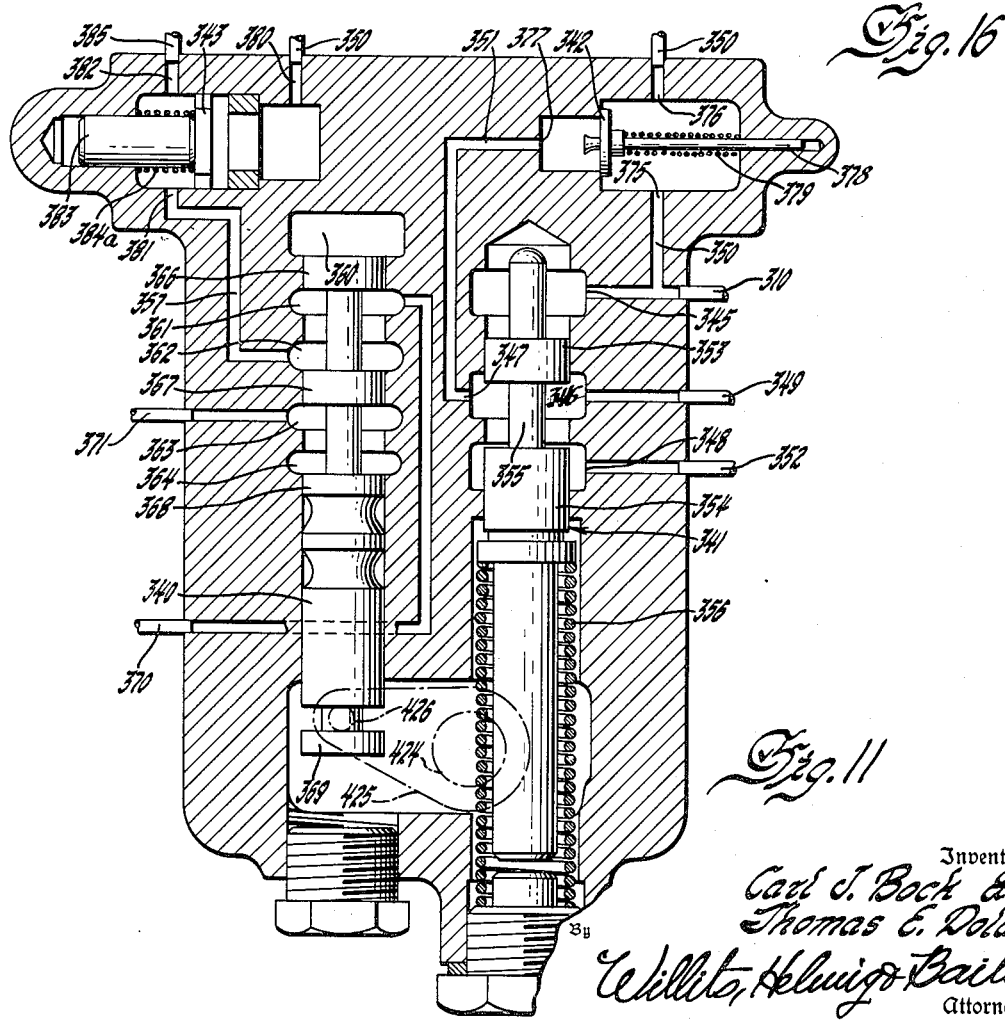
Figure 11 is a partially sectional view of the control valving for the auxiliary transmission unit.
Figure 12:
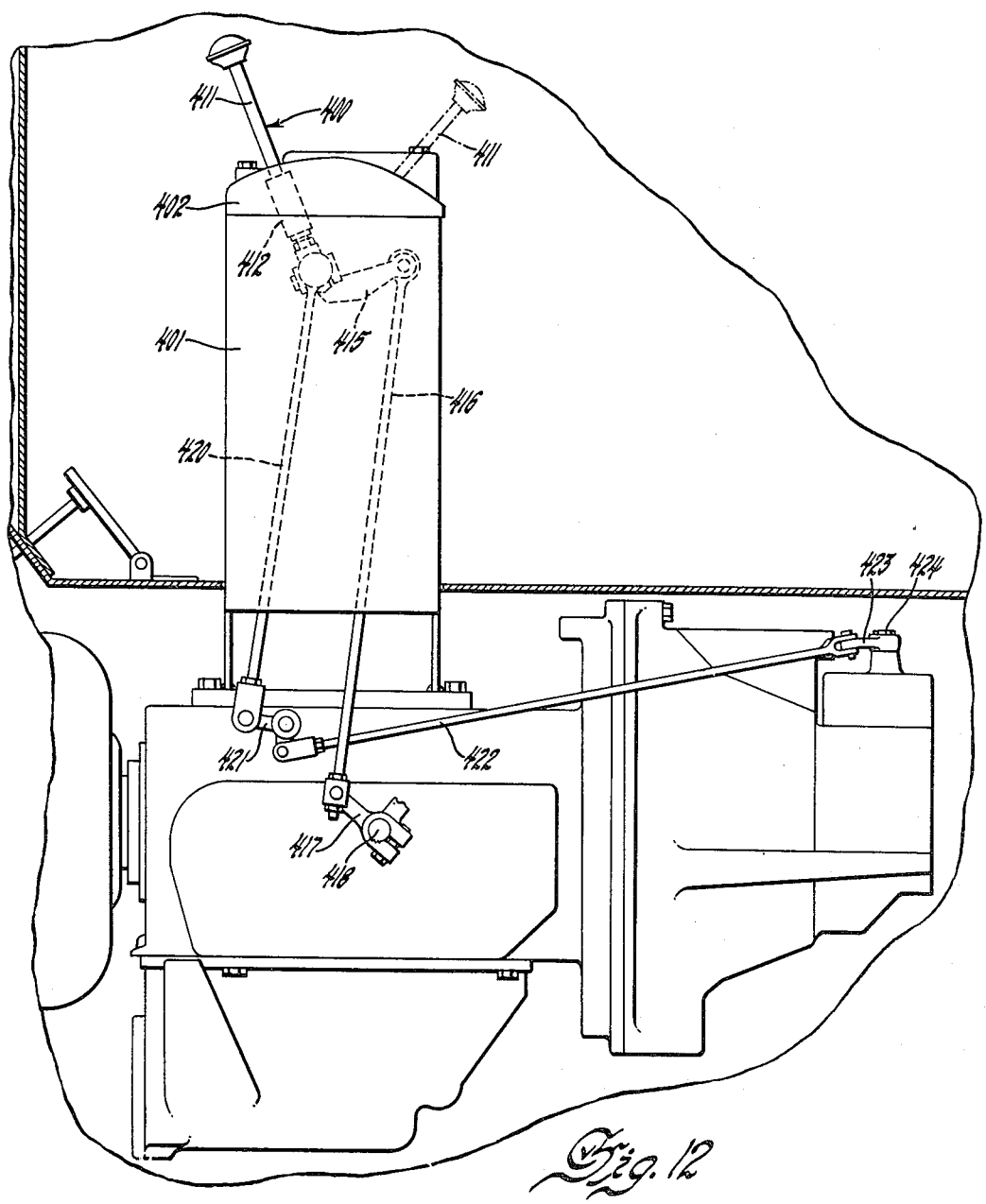
Figure 12 is a schematic diagram illustrating the control linkage for positioning the primary and auxiliary transmission manually operated control valves.
Figure 13:
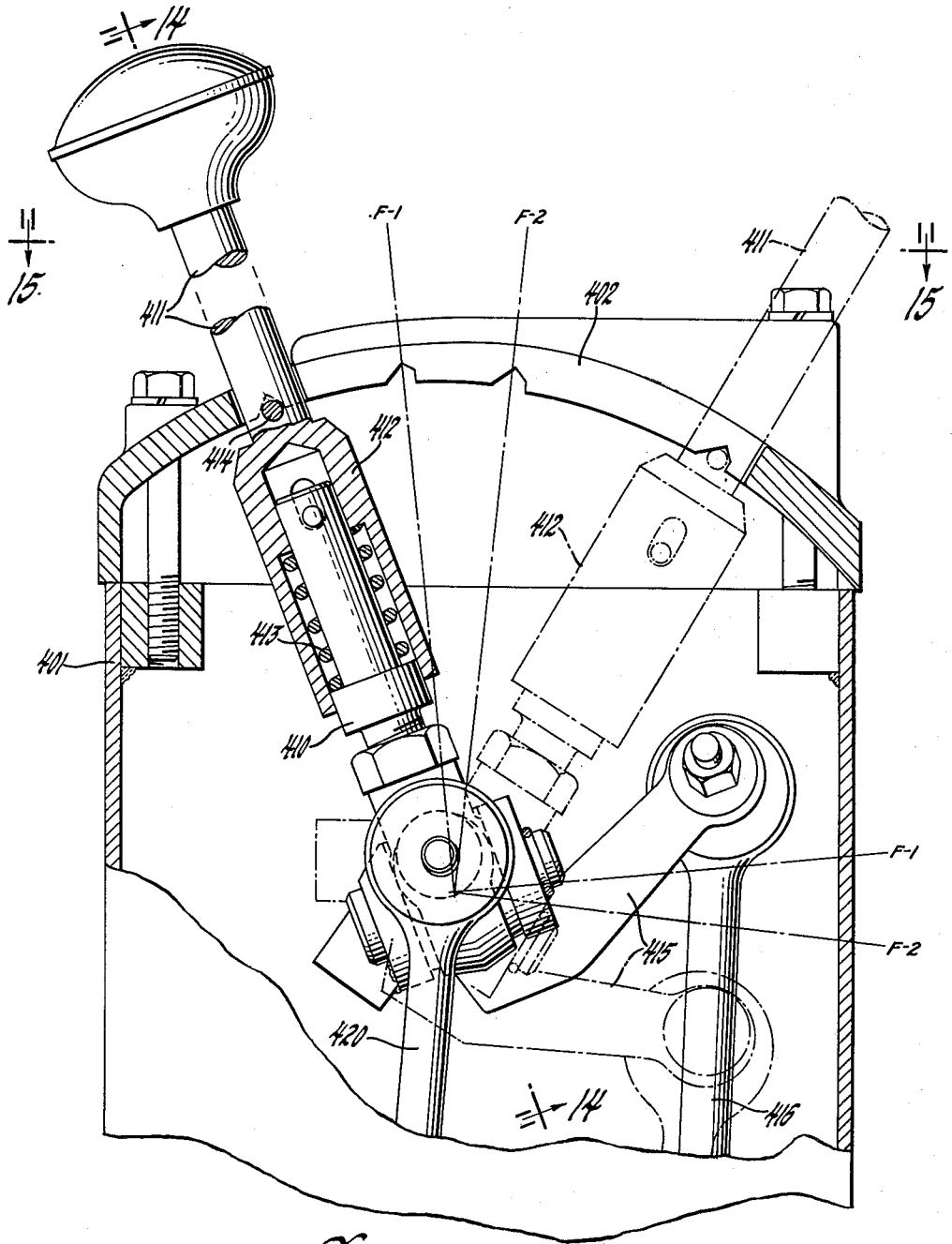
Figure 13 is a partially sectional view of the control mechanism for positioning the primary and auxiliary transmission unit manually operated valves.

The stub base 410 is positioned for lateral motion with respect to the control column 401, such motion being permitted by slot 404 of the cover 402. A nipple 419 fixed to stub base 410 and extending outwardly from the side thereof moves to raise or lower a link 420 when the control handle is moved laterally in slot 404. Link 420 is connected to link 422 by means of a bell crank lever 421, the latter link being connected to rotate shaft 424 by means of lever 423 fixed to shaft 424. Rotation of shaft 424 positions the auxiliary unit manually operated valve 340 for either direct drive or reduction drive through the auxiliary transmission gearing unit by rotating lever 425 (see Figure 11) and pin 426.

Thus, in operation, movement of handle 411 in either guide slots 403 or 405, the rock-shaft 409 is rotated about bearing 407 to control the valve 170. Such motion has no effect upon the linkage controlling valve 340. On the other hand, motion of handle 411 through slot 404 causes rock-shaft 409 to pivot in U-shaped member 408, such motion controlling the linkage to valve 340, but having no effect upon the linkage controlling valve 170. Movement of the control handle 411 in either slots 403 or 405 is effective to position the manual valve 170 for reverse, F-1 range, F-2 range, or neutral condition of operation of the primary transmission unit. With the control handle operating in slot 403, the auxiliary gearing unit control valve 340 is positioned for direct drive through the auxiliary unit. With the control handle positioned for operation in slot 405, the auxiliary unit valve 340 is positioned for reduction operation of the auxiliary gearing unit. With the control handle positioned in slot 404, the valve 170 is positioned in neutral so that no torque may be transmitted through the transmission. By this arrangement, shift of the gear ratio of the auxiliary unit may be accomplished only when the front unit is conditioned for neutral or no-drive operation.

From the earlier description of the hydraulic control system and the present description of the manual control system, it will be apparent that the shift valve 170 may be positioned for two ranges of operation of the primary transmission unit permitting four forward speeds in each range, but with a different time of shift with respect to vehicle speed. These two ranges, namely F-1, and F-2, may be selected by the vehicle operator with the auxiliary transmission unit either in high range (direct drive) or low range (reduction drive) but in order to change the range of operation of the auxiliary unit, the primary unit control valve 170 must be positioned for neutral operation.

Figure 16:
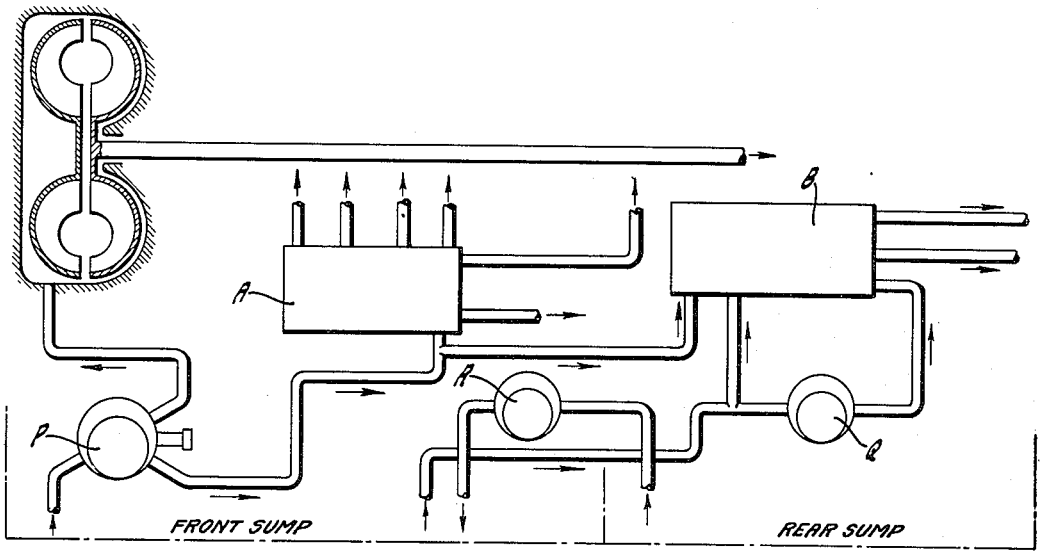
Figure 16 is a schematic diagram of the transmission pump arrangement.

Figure 16 is a schematic diagram of the pump arrangement of the transmission. The engine driven pump P draws from the primary transmission unit sump and delivers pressure to the valve control body A of the primary transmission unit, to the fluid coupling, and to the control valve assembly of the auxiliary transmission unit. The tail shaft driven pump Q draws from the primary transmission sump and delivers pressure to the control valve assembly B of the auxiliary unit. This pressure, however, will be utilized for controlling both the primary and auxiliary transmission units in the event of front pump failure. A third pump R acts as a scavenger pump to deliver fluid from the auxiliary transmission sump to the primary transmission sump.

The preceding description recites the objects, advantages and useful results of the invention, and there has been embodied therein a number of novel features in combination, which are subject to specific arrangement and forms of structure without departing from the spirit and scope of the invention, as set forth in the appended claims.

We claim:

1. In a control system for a transmission having a pair of gearing units and having fluid pressure responsive servo members operably associated with each of said units for determining the gear ratio in said units, respectively, a fluid pressure source, valve means including fluid pressure controlled shift valves and a manually operated valve for controlling the admission of pressure fluid from said source to the servo members of one of said gearing units, a manually operated valve for controlling the admission of pressure fluid from said source to the servo members of the other of said gearing units, controlling means for said valves and interconnecting means associated with said manually operated valve controlling means, said interconnecting means being effective to move one of said manually operated valves only when the other of said manually operated valves is disposed in a predetermined position.

2. In a control system for a transmission having first and second gearing units connected in series and having fluid pressure responsive servo members associated with each of said units for determining the gear ratio of each of said units, respectively, a source of pressure fluid, a fluid pressure control system for said first unit including a plurality of automatically movable shift valves operable to select a plurality of gear ratios for said first unit and including a manually operable valve for selecting neutral operation of said first unit, a control system for said second unit including a manually operable valve for selecting the gear ratio of said second unit, and interconnecting means between said manually operable valve control systems effective to shift one of said valves to change the gear ratio in one of said units only when the other of said valve means is positioned for neutral operation of said other unit.

3. In a control system for a transmission having a pair of gearing units and having fluid pressure responsive servo members operably associated with each of said units for determining the gear ratio of each of said units, respectively, a fluid pressure source, valve means including fluid pressure controlled shift valves and a manually operated valve for controlling the admission of pressure fluid to the servo members of one of said units, said manually operated valve being movable to select neutral, reverse, and forward condition of operation of said gearing unit, a manually operated valve for controlling the admission of fluid pressure to the servo members of the other of said gearing units to select direct drive or reduction drive through said unit, controlling means for said valves, and interconnecting means associated with said manually operated valve controlling means effective to shift said last-mentioned manually operated valve solely when said first mentioned manually operated valve is positioned for neutral condition of operation of the gearing unit controlled thereby.

4. In a control system for a transmission having a pair of gearing units and having fluid pressure responsive servo members operably associated with said units for determining the gear ratio of said units, respectively, a fluid pressure source, valve means including fluid pressure controlled shift valves and a manually operated valve for controlling the admission of fluid pressure to the servo members of one of said units, said manually operated valve being movable to select neutral, reverse, and forward operation of said gearing unit, a manually operated valve for controlling the admission of fluid pressure to the other of said gearing units, said valve being movable to select direct drive or reduction drive through said unit, and a common operating member for shifting said manually operated valves, said common operating member being effective to shift said last-mentioned manually operated valve only when said first-mentioned manually operated valve is positioned for neutral operation of the gearing unit controlled thereby.

5. In a control system for an engine driven vehicle transmission having a gearing unit adapted to provide a plurality of forward drive gear ratios, neutral, and reverse, fluid pressure responsive servo members associated with the gearing of said unit for determining the gear ratio thereof, a source of fluid pressure adapted to be operatively connected to said servo members, a plurality of shift valves movable to direct pressure from said source to said servo members, a governor for directing pressure to said shift valves for causing progressive upshift thereof, a manually operated valve movable to neutral, reverse, and two ranges of forward drive in said transmission, and a pressure metering valve effective in one position of said manually operated valve to direct a variable pressure to said shift valves tending to downshift the valves and effective in another position of said manually operated valve to deliver full pressure from said source to said shift valves and tending to downshift the same.

6. In a control system for an engine driven vehicle transmission having a gearing unit adapted to provide a plurality of forward drive ratios, said engine providing a source of vacuum, fluid pressure responsive servo members associated with the gearing of said unit for determining the gear ratio thereof, a source of fluid pressure adapted to be operatively connected to said servo members, a plurality of shift valves movable to direct fluid pressure from said source to said servo members, a governor responsive to vehicle speed for directing pressure to said shift valves to progressively upshift the same, a manually operated valve movable to two forward transmission drive ranges, and a pressure metering valve effective in one forward drive range position of said manually operated valve to direct a variable pressure determined by said engine vacuum to said shift valves for downshifting the same and effective in the other of said forward drive range positions of said manually operated valve to deliver full pressure from said source to said shift valves for downshifting the same irrespective of the amount of engine vacuum.

7. In a control system for an engine driven vehicle transmission having gearing adapted to provide a plurality of forward drive ratios, said engine providing a source of vacuum, fluid pressure responsive servo members associated with said gearing for determining the gear ratio thereof, a source of fluid pressure adapted to be operatively connected to said servo members, a plurality of shift valves movable to direct fluid pressure from said source to said servo members, a governor responsive to vehicle speed for directing fluid pressure to said shift valves to progressively upshift the same, a driver operable control valve movable to two forward transmission drive ranges, a pressure metering valve effective in one forward drive range position of said driver operable control valve to direct a variable pressure determined by said engine vacuum to downshift said shift valves and effective in the other of said forward drive range positions of said driver operable control valve to deliver full pressure from said source to said shift valves, said pressure metering valve having a spring yieldably urging said valve in a direction to increase the pressure level of the pressure delivered by said valve and means subject to engine vacuum for decreasing the pressure level of the pressure delivered by said valve, said driver operable control valve being effective in its last-mentioned forward drive range position to direct pressure from said source to said pressure metering valve to move said valve to its full pressure delivery position irrespective of the effect of engine vacuum upon said pressure metering valve.

8. In a control system for an engine driven vehicle transmission having gearing adapted to provide a plurality of forward drive ratios, said engine providing a source of vacuum, fluid pressure responsive servo members associated with said gearing for controlling the gear ratio thereof, a source of fluid pressure adapted to be operatively connected to said servo members, shift valves for admitting pressure to said servos and controlling shift of gear ratio from first to second, second to third, and third to fourth gear ratio, respectively, each of said shift valves having a piston formed integrally therewith, governor plugs associated with each of said shift valves, regulator plugs associated with each of said shift valves, a governor responsive to vehicle speed for directing pressure to said shift valve pistons and governor plugs tending to progressively upshift said valves, a manually operated control valve movable to two forward drive ranges, a pressure metering valve effective in any forward drive range position of said manually operated valve to direct a variable pressure determined by said engine vacuum to the regulator plugs associated with each of said valves and to said valve pistons tending to downshift said valves, said manually operated valve including ports effective when said manually operated valve is moved to its other forward drive range position to direct pressure from said source to said pressure metering valve to move said valve to its full pressure delivery position and to admit full pressure from said source to additional ports associated with said second to third and third to fourth shift valve regulator plugs other than the ports thereof normally supplied with metered pressure when said manually operated valve is positioned in its first-mentioned drive range position.

9. In a control system for an engine driven vehicle transmission having a pair of gearing units connected in series, fluid pressure responsive servo members for determining the gear ratio in each of said units, respectively, a source of fluid pressure adapted to be operatively connected to the servo members of each unit, a plurality of pressure responsive shift valves for directing fluid pressure from said source to the servo members of one of said units to determine the gear ratio therein, a speed responsive governor for directing pressure from said source to said shift valves and tending to upshift the same, a pressure metering valve for directing a variable pressure to said shift valves tending to downshift the same, a manually operated valve adapted to be placed in two forward drive range positions, neutral, and reverse, and effective in one forward drive range position to render said metering valve effective to deliver a variable pressure to said shift valves tending to downshift the same and effective in another drive range position to move said metering valve to its full pressure delivery position, a manually operated valve movable to direct fluid pressure from said source to the servo units associated with said other gearing unit to alternately select direct drive or reduction drive through said unit, and a common operating member for moving said manually operated valves, said common operating member being effective to shift said last-mentioned manually operated valve only when said first-mentioned manually operated valve is positioned to select neutral operation of said first-mentioned gearing unit.

10. In a control system for an engine driven vehicle transmission having a pair of gearing units connected in series, said engine having an intake manifold providing a source of vacuum, fluid pressure responsive servo members for determining the gear ratio in each of said units, respectively, a source of fluid pressure for actuating the servo members of each of said units, a plurality of pressure responsive shift valves for directing fluid pressure from said source to the servo members of one of said units to determine the gear ratio therein, a governor responsive to vehicle speed hydraulically connected to said shift valves, the pressure delivered by said governor tending to upshift said valves, a manually operated valve adapted to be positioned for neutral, reverse, or two forward conditions of operation of said one gearing unit, a pressure metering valve for directing a variable pressure to said shift valves and tending to downshift the same, a spring yieldably biasing said valve towards its full pressure delivery position, means operatively connecting said valve to the said engine intake manifold vacuum tending to move said valve to decrease the pressure delivered by said valve, said pressure metering valve being effective to deliver pressure controlled by engine vacuum when said manually operated valve is positioned for one forward drive range condition of transmission operation, a port in said manually operated valve effective when said manually operated valve is moved to its other forward drive range position to admit pressure to said pressure metering valve to move said pressure metering valve to its full pressure delivery position whereby said valve is caused to deliver full pressure from said pressure source to said shift valves irrespective of said engine manifold vacuum, a manually operated valve movable to direct fluid pressure from said source to the servo units associated with said other gearing unit to alternately select direct drive or reduction drive through said unit, and a common operating member for moving said manually operated valves, said common operating member being effective to move said last-mentioned manually operated valve only when said first-mentioned manually operated valve is positioned to select neutral operation of said first-mentioned gearing unit.

11. A transmission drive structure for transmitting torque from a power source to a load shaft including a pair of gearing units connected in series, one of said units including gearing adapted to provide four forward gear ratios, neutral, and reverse, and the other of said units including gearing adapted to provide direct drive and reduction drive therethrough, fluid pressure responsive servo members for determining the gear ratio of the first-mentioned gearing unit, fluid pressure responsive servo members for determining the gear ratio of the second-mentioned gearing unit, a common source of fluid pressure for actuating the servo members of each gearing unit, a control system for said first gearing unit including a plurality of pressure responsive shift valves, a pressure metering valve and a manually operated valve for operatively connecting said source to the servo members of said first-mentioned unit for selecting neutral, reverse, and four forward gear ratios in said first gearing unit, said manually operated valve having two effective forward drive range positions for varying the timing of movement of said shift valves, and a manually operated valve for controlling the servo members of said second-mentioned gearing unit to alternately select direct drive or reduction drive through said gearing unit.

12. A transmission drive structure for transmitting torque from a power source to a load shaft including a pair of gearing units connected in series, one of said units including gearing adapted to provide four forward gear ratios, neutral, and reverse, and the other of said units including gearing adapted to provide direct drive and reduction drive therethrough, fluid pressure responsive servo members for determining the gear ratio of the first-mentioned gearing unit, fluid pressure responsive servo members for determining the gear ratio of the second-mentioned gearing unit, a fluid pressure source, a control system for said first gearing unit including a plurality of pressure responsive shift valves, a pressure metering valve, and a manually operated valve for operatively connecting said source to the servo members of said first-mentioned gearing unit for selecting neutral, reverse, and four forward gear ratios in said first gearing unit, said manually operated valve having two effective forward drive range positions for varying the timing of movement of said shift valves, a manually operated valve for operatively connecting the servo members of said second-mentioned gearing unit to alternately select direct drive or reduction drive through said gearing unit, and a common operating member for positioning said manually operated valves.

13. A transmission drive structure for transmitting torque from a power source to a load shaft including a pair of transmission units connected in series, one of said units including gearing adapted to provide four forward gear ratios, neutral, and reverse, and the other of said transmission units including gearing adapted to provide direct drive and reduction drive therethrough, fluid pressure responsive servo members for determining the gear ratio of said first-mentioned unit, fluid pressure responsive servo members for determining the gear ratio of said second-mentioned gearing unit, a common source of fluid pressure for actuating the servo members of each gearing unit, a control system for said first gearing unit including a plurality of pressure responsive shift valves, a pressure metering valve, and a manually operated valve for operatively connecting said source to the servo members of said first-mentioned unit for selecting neutral, reverse, and four forward gear ratios in said first-mentioned unit, said manually operated valve being effective in one forward drive range position to permit said pressure metering valve to deliver a variable pressure to said shift valves for timing the operation thereof and effective in another forward drive range position to move said pressure metering valve to a full pressure delivery position for a different timing of the operation of said shift valves, and a manually operated valve for controlling the servo members of said second-mentioned gearing unit to alternately select direct drive or reduction drive through said gearing unit.

14. A transmission drive structure for transmitting torque from a power source to a load shaft including a pair of gearing units connected in series, one of said units including gearing adapted to provide four forward gear ratios, neutral, and reverse, and the other of said units including gearing adapted to provide direct drive and reduction drive therethrough, fluid pressure responsive servo members for determining the gear ratio of the first-mentioned gearing unit, fluid pressure responsive servo members for determining the gear ratio of the second-mentioned gearing unit, a fluid pressure source, a control system for said first gearing unit including a plurality of pressure responsive shift valves, a pressure metering valve, and a manually operated valve for operatively connecting said source to the servo members of said first-mentioned gearing unit for selecting neutral, reverse, and four forward gear ratios in said first gearing unit, said manually operated valve having two effective forward drive range positions for varying the timing of movement of said shift valves, a manually operated valve for operatively connecting the servo members of said second-mentioned gearing unit to alternately select direct drive or reduction drive through said gearing unit, a common operating member for positioning said manually operated valves, and means operatively associated with said common operating member for permitting shifting of said second-mentioned manually operated valve only when said first-mentioned manually operated valve is positioned for neutral condition of operation of said first-mentioned transmission unit.

15. A transmission drive structure for transmitting torque from a power source to a load shaft including a pair of transmission units connected in series, one of said units including gearing adapted to provide four forward gear ratios, neutral, and reverse, and the other of said transmission units including gearing adapted to provide direct drive and reduction drive therethrough, fluid pressure responsive servo members for determining the gear ratio of said first-mentioned unit, fluid pressure responsive servo members for determining the gear ratio of said second-mentioned gearing unit, a common source of fluid pressure for actuating the servo members of each gearing unit, a control system for said first gearing unit including a plurality of pressure responsive shift valves, a pressure metering valve, and a manually operated valve for operatively connecting said source to the servo members of said first-mentioned unit for selecting neutral, reverse, and four forward gear ratios in said first-mentioned unit, said manually operated valve being effective in one forward drive range position to permit said pressure metering valve to deliver a variable pressure to said shift valves for timing the operation thereof and effective in another forward drive range position to move said pressure metering valve to a full pressure delivery position for a different timing of the operation of said shift valves, a manually operated valve for controlling the servo members of said second-mentioned gearing unit to alternately select direct drive at reduction drive through said gearing unit, a common operating member for positioning said manually operated valves, and guide means operatively associated with said common operating member for permitting shifting of said second-mentioned manually operated valve only when said first-mentioned manually operated valve is positioned for neutral condition of operation of said first-mentioned transmission unit.

16. In a control system for a transmission having a first gearing unit adapted to provide a plurality of gear ratios, a manually operable valve adapted to provide forward, neutral and reverse operation of said first gearing unit, hydraulically controlled shift valves for automatically selecting different drive ratios through said first gearing unit, a second gearing unit driven by said first gearing unit adapted to provide a plurality of gear ratios, a manually operable valve for said second gearing unit for selecting the drive ratio of said second gearing unit, a control handle for controlling both of said manually operated valves, and a guide member having a plurality of slots for guiding movement of said control handle, said control handle being effective to position said second-mentioned manually operated valve to select one drive ratio through said second gearing unit when said handle is positioned in one of said slots and to select a different drive ratio in said second-mentioned gearing unit when said handle is placed in another of said slots, said control handle being effective to position said first-mentioned manually operable valve to select neutral drive condition of said first-mentioned transmission unit when said control handle is positioned in a third of said slots.

17. In a control system for a transmission having a pair of gearing units and having fluid pressure responsive servo members operably associated with each of said units for determining the gear ratio in said units, respectively, a fluid pressure source, valve means including fluid pressure controlled shift valves and a manually operated valve for controlling the admission of pressure fluid from said source to the servo members of one of said gearing units, a manually operable valve for controlling the admission of fluid pressure from said source to the servo members of the other of said gearing units, a common control handle for operating both of said manually operated valves, and a guide member for said control handle having a pair of parallel slots and an additional slot joining said pair of slots, said control handle being effective to position one of said manually operable valves to select one drive condition in one of said transmission units when said handle is positioned in one of said slots, said handle being effective to position said last-mentioned manually operable valve to select a different drive condition in said one transmission unit when said handle is positioned in another of said slots, and said handle being effective to position the other of said manually operable valves to select neutral condition of operation of the other of said transmission units when said control handle is positioned in the third of said slots.

18. In a control system for a transmission having a first gearing unit adapted to provide a plurality of gear ratios, a manually operable valve adapted to select forward, neutral and reverse operation of said first gearing unit, hydraulically controlled shift valves for automatically selecting different drive ratios through said first gearing unit, a vehicle speed responsive governor for delivering a variable fluid pressure to said shift valves, a pressure metering valve normally operative to deliver a variable fluid pressure to said shift valves, said governor pressure and metering valve pressure acting in opposition to each other to determine the position of said shift valves, a manually operable valve for said second gearing unit for selecting the drive ratio of said second gearing unit, a control handle for controlling both of said manually operable valves, and a slotted guide member for guiding the movement of said control handle, said guide member having a pair of slots joined to each other by a third slot, said control handle being effective to position said second-mentioned manually operable valve to select one drive ratio through said second gearing unit when placed in one of said pair of slots and a different drive ratio in said second gearing unit when placed in another of said pair of slots, said pressure metering valve being effective to deliver a variable pressure to said shift valves when said control handle is positioned at a given station in either of said pair of slots, and said control handle being effective to position said first gearing unit manually operable valve to overcontrol said pressure metering valve when said handle is positioned at a second station in either of said pair of slots, said control handle being effective to position said first gearing unit manually operable valve to select neutral condition of operation of said first gearing unit when said control handle is placed in the third of said slots.

19. In a control system for a transmission having a pair of gearing units and having fluid pressure responsive servo members operably associated with each of said units for determining the drive ratio in said units, respectively, a fluid pressure source, valve means including fluid pressure controlled shift valves and a manually operable valve for controlling the admission of fluid pressure from said source to the servo members of one of said gearing units, a pressure metering valve effective in one position of said manually operable valve to deliver a variable metered pressure to said shift valves, said manually operable valve being movable to a second position effective to position said pressure metering valve to deliver full line pressure from said source to said shift valves, and a manually operable valve for controlling the admission of fluid pressure from said source to the servo members of the other of said gearing units for controlling the drive ratio of said last-mentioned gearing unit.

20. In a control system for a transmission having a pair of gearing units and having fluid pressure responsive servo members operably associated with each of said units for determining the drive ratio in said units, respectively, a fluid pressure source, valve means including fluid pressure controlled shift valves and a manually operable valve for controlling the admission of fluid pressure from said source to the servo members of one of said units, a pressure metering valve effective in one position of said manually operable valve to deliver a variable metered pressure to said shift valves, said manually operable valve being effective in a second position to position said pressure metering valve to connect said shift valves directly to said fluid pressure source, a manually operable valve for controlling the drive ratio of the other of said gearing units, and a common control handle for controlling the position of both of said manually operable valves.

21. In a control system for a transmission having a pair of gearing units and having fluid pressure responsive servo members operably associated with each of said units for determining the drive ratio in said units, respectively, a fluid pressure source, valve means including fluid pressure controlled shift valves and a manually operable valve for controlling the admission of fluid pressure from said source to the servo members of one of said units, a pressure metering valve effective in one position of said manually operable valve to deliver a variable metered pressure to said shift valves, said manually operable valve being effective in a second position to position said pressure metering valve to connect said shift valves directly to said fluid pressure source, a manually operable valve for controlling the drive ratio of the other of said gearing units, a common control handle for controlling the position of both of said manually operable valves, and guide means for guiding movement of said control handle, said guide means including a slotted member having a plurality of slots through which said handle is movable, said control handle being effective when positioned in one of said slots to position one of said manually operable valves to select a given drive ratio in one of said gearing units, said handle being effective at one station in said slot to position said pressure metering valve to directly connect said shift valves to said fluid pressure source and effective in a second position in said slot to permit said pressure metering valve to deliver a variable pressure to said shift valves, said control handle being effective upon movement in a second of said slots to position one of said manual valves to establish neutral drive condition of operation in the other of said gearing units.

22. In a control system for a transmission having a pair of gearing units and having fluid pressure responsive servo members operably associated with each of said units for determining the drive ratio in said units, respectively, a fluid pressure source, valve means including fluid pressure controlled shift valves and a manually operable valve for controlling the admission of fluid pressure from said source to the servo members of one of said units, a pressure metering valve effective in one position of said manually operable valve to deliver a variable metered pressure to said shift valves, said manually operable valve being effective in a second position to position said pressure metering valve to connect said shift valves directly to said fluid pressure source, a manually operable valve for controlling the drive ratio of the other of said gearing units, a common control handle for controlling the position of both of said manually operable valves, and guide means for guiding movement of said control handle, said guide means including a slotted member having a plurality of slots through which said handle is movable, said control handle being effective when positioned in one of said slots to position one of said manually operable valves to select a given drive ratio in one of said gearing units, said handle being effective at one station in said slot to position said pressure metering valve to directly connect said shift valves to said fluid pressure source and effective in a second position in said slot to permit said pressure metering valve to deliver a variable pressure to said shift valves, said control handle being effective upon movement in a second of said slots to position one of said manual valves to establish neutral drive condition of operation in the other of said gearing units, said control handle being effective upon movement in a third of said slots to position said one manually operable valve to establish a different drive ratio in said one gearing unit.

23. In a control system for a transmission having a pair of gearing units and having fluid pressure responsive servo members operably associated with each of said units for determining the drive ratio in said units, respectively, a fluid pressure source, valve means including fluid pressure controlled shift valves and a manually operable valve for controlling the admission of fluid pressure from said source to the servo members of one of said units, a pressure metering valve effective in one position of said manually operable valve to deliver a variable metered pressure to said shift valves, said manually operable valve being effective in a second position to position said pressure metering valve to connect said shift valves directly to said fluid pressure source, a manually operable valve for controlling the drive ratio of the other of said gearing units, a common control handle for controlling the position of both of said manually operable valves, and guide means for guiding movement of said control handle, said guide means including a slotted member having a plurality of slots through which said handle is movable, said control handle being effective when positioned in one of said slots to position one of said manually operable valves to select a given drive ratio in one of said gearing units, said handle being effective at one station in said slot to position said pressure metering valve to directly connect said shift valves to said fluid pressure source and effective in a second position in said slot to permit said pressure metering valve to deliver a variable pressure to said shift valves, said control handle being effective upon movement in a second of said slots to position one of said manual valves to establish neutral drive condition of operation in the other of said gearing units, said control handle being effective upon movement in a third of said slots to position said one manually operable valve to establish a different drive ratio in said one gearing unit, said control handle being effective at one station in said third slot to permit said pressure metering valve to deliver a variable metered pressure to said shift valves and effective at a second position in said third slot to position said pressure metering valve to directly connect said shift valves to said fluid pressure source.

24. In a control system for an engine driven vehicle transmission, an engine driven pump, a vehicle speed responsive pump, a pressure regulator valve, fluid pressure responsive servo members operable to establish different drive ratios in said transmission, a manually operable valve for controlling the admission of pressure to said servo members, an accumulator, a passage for conducting pump pressure to said manually operable valve, a check valve responsive to pressure in said passage effective in one position to admit pump pressure to said manually operable valve and to said accumulator and effective in a second position to block off said manually operable valve from said pump pressure and to connect said valve to said accumulator, a passage from said vehicle speed responsive pump, and a check valve in said last-mentioned passage effective in one position to block off said last-mentioned passage from said first-mentioned passage and responsive to pressure delivered by said vehicle speed responsive pump to connect said passages, said first-mentioned passage being connected to one end of said pressure regulator valve and to one end of said first-mentioned check valve.

25. In a control system for an engine driven vehicle transmission providing a plurality of ratios, an engine driven pump, a vehicle speed responsive pump, a pair of fluid pressure responsive servo members selectively operable to establish said different drive ratios in said transmission, a manually operable valve effective in one position to direct fluid pressure to one of said servos and to simultaneously connect another of said servo to exhaust to establish one drive ratio, said manually operable valve being effective in another position to connect said one servo to exhaust and to simultaneously direct fluid pressure to said other servo to establish a different transmission drive ratio, a pressure regulator valve having a pair of spaced lands joined by a reduced stem section, a pressure supply passage connecting said engine driven pump to one end of said pressure regulator valve, a passage connecting said engine driven pump to said manually operable valve, a passage connecting said vehicle speed responsive pump to the space intermediate the spaced lands of said pressure regulator valve, and a passage for connecting the space between said pressure regulator valve lands to the passage connecting said engine driven pump to said manually operable valve.

26. A transmission drive structure for transmitting torque from a power source to a load shaft including a pair of gearing units, one of said units including gearing adapted to provide a plurality of forward drive ratios, neutral, and reverse, and the other of said units including gearing adapted to provide a plurality of drive ratios therethrough, fluid pressure responsive servo members for determining the drive ratio of the first mentioned gearing unit, fluid pressure responsive servo members for determining the drive ratio of the second mentioned gearing unit, a common source of fluid pressure for actuating the servo members of each gearing unit, a control system for said first gearing unit including a plurality of pressure responsive shift valves, a pressure metering valve and a manually operated valve for operatively connecting said source to the servo members of the first mentioned unit for selecting neutral, reverse, and a plurality of forward drive ratios in said first gearing unit, said manually operated valve having a plurality of effective forward drive range positions for varying the timing of the movement of said shift valves, and a manually operated valve for controlling the servo members of said second mentioned gearing unit to alternately select one of a plurality of drive ratios through said gearing unit.

27. A transmission drive structure for transmitting torque from a power source to a load shaft including a pair of gearing units, one of said units including gearing adapted to provide a plurality of forward drive ratios, neutral, and reverse, and the other of said units including gearing adapted to provide a plurality of drive ratios therethrough, fluid pressure responsive servo members for determining the drive ratio of the first mentioned gearing unit, fluid pressure responsive servo members for determining the drive ratio of the second mentioned gearing unit, a common source of fluid pressure for actuating the servo members of each gearing unit, a control system for said first gearing unit including a plurality of pressure responsive shift valves, a pressure metering valve and a manually operated valve for operatively connecting said source to the servo members of the first mentioned unit for selecting neutral, reverse, and a plurality of forward drive ratios in said first gearing unit, said manually operated valve having a plurality of effective forward drive range positions for varying the timing of the movement of said shift valves, and a manually operated valve for controlling the servo members of said second mentioned gearing unit to alternately select one of a plurality of drive ratios through said gearing unit, and a common operating member for positioning said manually operated valves.

28. A transmission drive structure for transmitting torque from a power source to a load shaft including a pair of gearing units, one of said units including gearing adapted to provide a plurality of forward drive ratios, neutral, and reverse, and the other of said units including gearing adapted to provide a plurality of drive ratios therethrough, fluid pressure responsive servo members for determining the drive ratio of the first mentioned gearing unit, fluid pressure responsive servo members for determining the drive ratio of the second mentioned gearing unit, a common source of fluid pressure for actuating the servo members of each gearing unit, a control system for said first gearing unit including a plurality of pressure responsive shift valves, a pressure metering valve and a manually operated valve for operatively connecting said source to the servo members of the first mentioned unit for selecting neutral, reverse, and a plurality of forward drive ratios in said first gearing unit, said manually operated valve having a plurality of effective forward drive range positions for varying the timing of the movement of said shift valves, and a manually operated valve for controlling the servo members of said second mentioned gearing unit to alternately select one of a plurality of drive ratios through said gearing unit, and a common operating member for positioning said manually operated valves, said common operating member being effective to shift said second mentioned manually operable valve only when said first mentioned manually operable valve is positioned for neutral operation of said first gearing unit.

References Cited in the file of this patent

UNITED STATES PATENTS

| | | |
|---|---|---|
| 1,619,705 | Chorlton | Mar. 1, 1927 |
| 1,788,899 | Tenny | Jan. 13, 1931 |
| 2,080,067 | Stucator | May 11, 1937 |
| 2,204,872 | Thompson | June 18, 1940 |
| 2,329,724 | Maurer | Sept. 21, 1943 |
| 2,332,593 | Nutt et al. | Oct. 26, 1943 |
| 2,377,696 | Kelley | June 5, 1945 |
| 2,426,722 | Boade | Sept. 2, 1947 |
| 2,548,208 | Evernden | Apr. 10, 1951 |
| 2,559,128 | McFarland | July 13, 1951 |

FOREIGN PATENTS

| | | |
|---|---|---|
| 600,790 | Great Britain | Apr. 19, 1948 |